US011429183B2

(12) United States Patent
    Woods

(10) Patent No.: US 11,429,183 B2
(45) Date of Patent: Aug. 30, 2022

(54) SYSTEMS AND METHODS FOR AUGMENTED REALITY

(71) Applicant: MAGIC LEAP, INC., Plantation, FL (US)

(72) Inventor: Michael Woods, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/137,107

(22) Filed: Dec. 29, 2020

(65) Prior Publication Data
    US 2021/0116994 A1    Apr. 22, 2021

Related U.S. Application Data

(63) Continuation of application No. 15/062,104, filed on Mar. 5, 2016, now abandoned.
    (Continued)

(51) Int. Cl.
    *G06F 3/01*    (2006.01)
    *G06F 3/0346*    (2013.01)
    (Continued)

(52) U.S. Cl.
    CPC .............. *G06F 3/012* (2013.01); *G01S 19/42* (2013.01); *G06F 3/017* (2013.01); *G06F 3/0304* (2013.01);
    (Continued)

(58) Field of Classification Search
    CPC ........ G06F 3/012; G06F 3/017; G06F 3/0304; G06F 3/0346; G01S 19/42; G06T 19/006;
    (Continued)

(56) References Cited

U.S. PATENT DOCUMENTS 4,462,165 A    7/1984 Lewis
5,280,265 A    1/1994 Kramer et al.
(Continued)

FOREIGN PATENT DOCUMENTS

AU    2017214748    8/2018
AU    2017305227    2/2019
(Continued)

OTHER PUBLICATIONS

Foreign NOA for KR Patent Appln. No. 10-2019-7022837 dated Jan. 27, 2021.
(Continued)

*Primary Examiner* — Bryan Earles
(74) *Attorney, Agent, or Firm* — Vista IP Law Group, LLP

(57) ABSTRACT

Configurations are disclosed for presenting virtual reality and augmented reality experiences to users. An augmented reality display system comprises a handheld component housing an electromagnetic field emitter, the electromagnetic field emitter emitting a known magnetic field, the head mounted component coupled to one or more electromagnetic sensors that detect the magnetic field emitted by the electromagnetic field emitter housed in the handheld component, wherein a head pose is known, and a controller communicatively coupled to the handheld component and the head mounted component, the controller receiving magnetic field data from the handheld component, and receiving sensor data from the head mounted component, wherein the controller determining a hand pose based at least in part on the received magnetic field data and the received sensor data.

20 Claims, 22 Drawing Sheets

Related U.S. Application Data

(60) Provisional application No. 62/292,185, filed on Feb. 5, 2016, provisional application No. 62/128,993, filed on Mar. 5, 2015.

(51) Int. Cl.
*G06F 3/03* (2006.01)
*G06T 19/00* (2011.01)
*G01S 19/42* (2010.01)
*G02B 27/01* (2006.01)

(52) U.S. Cl.
CPC .......... *G06F 3/0346* (2013.01); *G06T 19/006* (2013.01); *G02B 27/017* (2013.01); *G02B 2027/0187* (2013.01)

(58) Field of Classification Search
CPC . G02B 27/017; G02B 2027/0187; G01B 7/00
See application file for complete search history.

(56) References Cited

U.S. PATENT DOCUMENTS

| | | | |
|---|---|---|---|
| 5,583,974 | A | 12/1996 | Winner et al. |
| 5,592,401 | A | 1/1997 | Kramer |
| 5,684,498 | A | 11/1997 | Welch et al. |
| 5,784,115 | A | 7/1998 | Bozdagi |
| 5,844,530 | A * | 12/1998 | Tosaki .................... A63F 13/25 345/8 |
| 5,930,741 | A | 7/1999 | Kramer |
| 6,377,401 | B1 | 4/2002 | Bartlett |
| 6,407,736 | B1 | 6/2002 | Regan |
| 6,701,296 | B1 | 3/2004 | Kramer et al. |
| 6,891,533 | B1 | 5/2005 | Alcorn et al. |
| 7,375,529 | B2 | 5/2008 | Dupuis et al. |
| 7,443,154 | B1 | 10/2008 | Merewether et al. |
| 8,165,352 | B1 | 4/2012 | Mohanty et al. |
| 8,401,308 | B2 | 3/2013 | Nakamura et al. |
| 8,446,426 | B2 | 5/2013 | Gonion |
| 8,950,867 | B2 | 2/2015 | Macnamara |
| 8,989,775 | B2 | 3/2015 | Shaw |
| 9,013,505 | B1 | 4/2015 | Thorton |
| 9,160,727 | B1 | 10/2015 | Saylor et al. |
| 9,215,293 | B2 | 12/2015 | Miller |
| 9,417,452 | B2 | 8/2016 | Schowengerdt et al. |
| 9,465,129 | B1 | 10/2016 | Olsson et al. |
| 9,639,935 | B1 | 5/2017 | Douady-Plevin et al. |
| 9,671,566 | B2 | 6/2017 | Abovitz et al. |
| 9,791,700 | B2 | 10/2017 | Schowengerdt |
| 9,814,430 | B1 | 11/2017 | Berme et al. |
| 9,874,749 | B2 | 1/2018 | Bradski et al. |
| 9,952,673 | B2 | 4/2018 | Kramer et al. |
| 10,130,429 | B1 | 11/2018 | Weir |
| 10,338,677 | B2 | 7/2019 | Guenter |
| 10,481,689 | B1 | 11/2019 | Jeromin |
| 10,721,280 | B1 | 7/2020 | Heppner et al. |
| 10,843,067 | B1 | 11/2020 | Peuhkurinen et al. |
| 10,942,252 | B2 * | 3/2021 | Chen .................... G02B 27/017 |
| 10,964,119 | B2 | 3/2021 | Nourai et al. |
| 11,176,901 | B1 | 11/2021 | Hunt et al. |
| 2001/0043738 | A1 | 11/2001 | Sawney et al. |
| 2002/0033803 | A1 | 3/2002 | Holzrichter et al. |
| 2002/0180727 | A1 | 12/2002 | Guckenberger et al. |
| 2003/0052965 | A1 | 3/2003 | Junkins et al. |
| 2003/0092448 | A1 | 5/2003 | Forstrom et al. |
| 2003/0120448 | A1 | 7/2003 | Moriya et al. |
| 2003/0234823 | A1 | 12/2003 | Sato et al. |
| 2004/0140949 | A1 | 7/2004 | Takagi |
| 2004/0174337 | A1 | 9/2004 | Kubota et al. |
| 2004/0201857 | A1 | 10/2004 | Foxlin |
| 2005/0107870 | A1 | 5/2005 | Wang et al. |
| 2005/0156601 | A1 | 7/2005 | Dupuis et al. |
| 2006/0161871 | A1 | 7/2006 | Hotelling et al. |
| 2006/0253804 | A1 | 11/2006 | Fukushima et al. |
| 2007/0049374 | A1 | 3/2007 | Ikeda et al. |
| 2007/0072674 | A1 | 3/2007 | Ohta et al. |
| 2007/0126733 | A1 | 6/2007 | Yang et al. |
| 2007/0273644 | A1 | 11/2007 | Mondine Natucci |
| 2007/0298883 | A1 | 12/2007 | Feldman et al. |
| 2008/0024523 | A1 | 1/2008 | Tomite et al. |
| 2008/0133521 | A1 | 6/2008 | Podilchuk |
| 2008/0275667 | A1 | 11/2008 | Ohta |
| 2008/0309884 | A1 | 12/2008 | O'Dor et al. |
| 2009/0005166 | A1 | 1/2009 | Sato |
| 2009/0051653 | A1 | 2/2009 | Barney et al. |
| 2009/0115406 | A1 | 5/2009 | Anderson et al. |
| 2009/0173886 | A1 | 7/2009 | Chowdhury |
| 2009/0184825 | A1 | 7/2009 | Anderson |
| 2010/0066676 | A1 | 3/2010 | Kramer et al. |
| 2010/0085423 | A1 | 4/2010 | Lange |
| 2010/0103205 | A1 | 4/2010 | Lisaka et al. |
| 2010/0141261 | A1 | 7/2010 | Overby et al. |
| 2010/0277476 | A1 | 11/2010 | Johansson et al. |
| 2010/0302152 | A1 | 12/2010 | Kirigaya |
| 2010/0309292 | A1 | 12/2010 | Ho et al. |
| 2011/0018874 | A1 | 1/2011 | Hasselgreen et al. |
| 2011/0025603 | A1 | 2/2011 | Underkoffler et al. |
| 2011/0184950 | A1 | 7/2011 | Skaff et al. |
| 2011/0199088 | A1 | 8/2011 | Bittar et al. |
| 2011/0238399 | A1 | 9/2011 | Ophir et al. |
| 2011/0248987 | A1 | 10/2011 | Mitchell |
| 2011/0263329 | A1 | 10/2011 | Miyazaki et al. |
| 2011/0298748 | A1 | 12/2011 | Chen et al. |
| 2012/0038549 | A1 | 2/2012 | Mandella et al. |
| 2012/0099800 | A1 | 4/2012 | Llano et al. |
| 2012/0117076 | A1 | 5/2012 | Austermann et al. |
| 2012/0194516 | A1 | 8/2012 | Newcombe et al. |
| 2012/0206452 | A1 | 8/2012 | Geisner et al. |
| 2012/0236030 | A1 | 9/2012 | Border et al. |
| 2012/0328196 | A1 | 12/2012 | Kasahara et al. |
| 2013/0002614 | A1 | 1/2013 | Nowatzyk et al. |
| 2013/0083011 | A1 | 4/2013 | Geisner et al. |
| 2013/0084984 | A1 | 4/2013 | Gagner et al. |
| 2013/0117377 | A1 | 5/2013 | Miller |
| 2013/0128230 | A1 | 5/2013 | Macnamara |
| 2013/0169626 | A1 | 7/2013 | Balan et al. |
| 2013/0225199 | A1 | 8/2013 | Shaw |
| 2013/0230211 | A1 | 9/2013 | Tanabiki et al. |
| 2013/0241773 | A1 | 9/2013 | Laine |
| 2013/0278635 | A1 | 10/2013 | Maggiore |
| 2013/0290222 | A1 | 10/2013 | Gordo et al. |
| 2013/0312009 | A1 | 11/2013 | Kramer et al. |
| 2013/0321462 | A1 | 12/2013 | Salter et al. |
| 2013/0346168 | A1 | 12/2013 | Zhou et al. |
| 2014/0006026 | A1 | 1/2014 | Lamb et al. |
| 2014/0011589 | A1 | 1/2014 | Barney et al. |
| 2014/0037140 | A1 | 2/2014 | Benhimane et al. |
| 2014/0062841 | A1 | 3/2014 | Ishikawa et al. |
| 2014/0075060 | A1 | 3/2014 | Sharp et al. |
| 2014/0080428 | A1 | 3/2014 | Rhoads et al. |
| 2014/0119598 | A1 | 5/2014 | Ramachandran et al. |
| 2014/0139226 | A1 | 5/2014 | Jaaskelainen et al. |
| 2014/0145932 | A1 | 5/2014 | Underkoffler et al. |
| 2014/0176591 | A1 | 6/2014 | Klein et al. |
| 2014/0181587 | A1 | 6/2014 | Sridharan et al. |
| 2014/0195988 | A1 | 7/2014 | Kramer et al. |
| 2014/0212027 | A1 | 7/2014 | Hallquist et al. |
| 2014/0222409 | A1 | 8/2014 | Efrat et al. |
| 2014/0225822 | A1 | 8/2014 | Underkoffler et al. |
| 2014/0267420 | A1 | 9/2014 | Schowengerdt et al. |
| 2014/0267646 | A1 | 9/2014 | Na'Aman et al. |
| 2014/0285375 | A1 | 9/2014 | Crain |
| 2014/0298269 | A1 | 10/2014 | Underkoffler et al. |
| 2014/0306866 | A1 | 10/2014 | Miller et al. |
| 2014/0321702 | A1 | 10/2014 | Schmalstieg |
| 2014/0323148 | A1 | 10/2014 | Schmalstieg et al. |
| 2014/0325373 | A1 | 10/2014 | Kramer et al. |
| 2014/0354548 | A1 | 12/2014 | Lee |
| 2015/0002542 | A1 | 1/2015 | Chan et al. |
| 2015/0016777 | A1 | 1/2015 | Abovitz et al. |
| 2015/0019651 | A1 | 1/2015 | Kazi et al. |
| 2015/0029218 | A1 | 1/2015 | Williams et al. |
| 2015/0040074 | A1 | 2/2015 | Hofmann et al. |
| 2015/0070347 | A1 | 3/2015 | Hofmann et al. |

(56) References Cited

U.S. PATENT DOCUMENTS

| | | |
|---|---|---|
| 2015/0077326 A1 | 3/2015 | Kramer et al. |
| 2015/0092015 A1 | 4/2015 | Stafford |
| 2015/0100380 A1 | 4/2015 | Jones, Jr. et al. |
| 2015/0100593 A1 | 4/2015 | Underkoffler et al. |
| 2015/0161476 A1 | 6/2015 | Kurz et al. |
| 2015/0163345 A1 | 6/2015 | Cornaby et al. |
| 2015/0172568 A1 | 6/2015 | Choe et al. |
| 2015/0177831 A1 | 6/2015 | Chan et al. |
| 2015/0178554 A1 | 6/2015 | Kanaujia et al. |
| 2015/0178939 A1 | 6/2015 | Bradski et al. |
| 2015/0205126 A1 | 7/2015 | Schowengerdt |
| 2015/0205364 A1 | 7/2015 | Underkoffler et al. |
| 2015/0205388 A1 | 7/2015 | Osterhout |
| 2015/0215611 A1 | 7/2015 | Wu et al. |
| 2015/0221133 A1 | 8/2015 | Groten et al. |
| 2015/0234477 A1 | 8/2015 | Abovitz et al. |
| 2015/0243080 A1 | 8/2015 | Steinbach et al. |
| 2015/0262372 A1 | 9/2015 | Cardoso et al. |
| 2015/0301592 A1 | 10/2015 | Miller |
| 2015/0302652 A1 | 10/2015 | Miller et al. |
| 2015/0309264 A1 | 10/2015 | Abovitz et al. |
| 2015/0309563 A1 | 10/2015 | Connor |
| 2015/0310310 A1 | 10/2015 | Hesch |
| 2015/0324198 A1 | 11/2015 | Alsup et al. |
| 2015/0339857 A1 | 11/2015 | O'Connor et al. |
| 2015/0346495 A1 | 12/2015 | Welch et al. |
| 2015/0358539 A1 | 12/2015 | Catt |
| 2015/0371082 A1 | 12/2015 | Csaszar et al. |
| 2015/0373369 A1 | 12/2015 | Jalai et al. |
| 2015/0379772 A1 | 12/2015 | Hoffman |
| 2016/0005233 A1 | 1/2016 | Fraccaroli et al. |
| 2016/0012643 A1 | 1/2016 | Kezele et al. |
| 2016/0016752 A1 | 1/2016 | Helseth et al. |
| 2016/0018896 A1 | 1/2016 | Kramer et al. |
| 2016/0021511 A1 | 1/2016 | Jin et al. |
| 2016/0026253 A1 | 1/2016 | Bradski et al. |
| 2016/0033768 A1* | 2/2016 | Pedrotti ............. G02B 27/0101 345/8 |
| 2016/0041048 A1 | 2/2016 | Blum et al. |
| 2016/0098095 A1 | 4/2016 | Gonzalez-Banos et al. |
| 2016/0104311 A1 | 4/2016 | Allyn |
| 2016/0117822 A1 | 4/2016 | Yii et al. |
| 2016/0147065 A1 | 5/2016 | Border et al. |
| 2016/0147070 A1 | 5/2016 | Border et al. |
| 2016/0171644 A1 | 6/2016 | Gruber |
| 2016/0180151 A1 | 6/2016 | Philbin et al. |
| 2016/0180592 A1 | 6/2016 | Bean et al. |
| 2016/0189680 A1 | 6/2016 | Paquette |
| 2016/0203624 A1 | 7/2016 | Anderson |
| 2016/0210783 A1 | 7/2016 | Tomlin et al. |
| 2016/0259032 A1 | 9/2016 | Hehn |
| 2016/0259404 A1 | 9/2016 | Woods |
| 2016/0262608 A1 | 9/2016 | Krueger |
| 2016/0282619 A1 | 9/2016 | Oto |
| 2016/0294958 A1 | 10/2016 | Zhang et al. |
| 2016/0299567 A1 | 10/2016 | Crisler et al. |
| 2016/0327789 A1 | 11/2016 | Klug et al. |
| 2016/0378863 A1 | 12/2016 | Shlens et al. |
| 2016/0379092 A1 | 12/2016 | Kutliroff |
| 2017/0011555 A1 | 1/2017 | Li et al. |
| 2017/0032220 A1 | 2/2017 | Medasani et al. |
| 2017/0076328 A1 | 3/2017 | Suzuki |
| 2017/0098406 A1 | 4/2017 | Kobayashi |
| 2017/0109916 A1 | 4/2017 | Kurz et al. |
| 2017/0126988 A1 | 5/2017 | Holzer et al. |
| 2017/0148206 A1 | 5/2017 | Donner et al. |
| 2017/0160798 A1 | 6/2017 | Lanman et al. |
| 2017/0161853 A1 | 6/2017 | Gossweiler et al. |
| 2017/0161919 A1 | 6/2017 | Schroeder |
| 2017/0177082 A1 | 6/2017 | Michail et al. |
| 2017/0184387 A1 | 6/2017 | Lefevre et al. |
| 2017/0205903 A1 | 7/2017 | Miller et al. |
| 2017/0213473 A1 | 7/2017 | Ribeira et al. |
| 2017/0243324 A1 | 8/2017 | Mierle et al. |
| 2017/0244811 A1 | 8/2017 | Mckenzie et al. |
| 2017/0345220 A1 | 11/2017 | Bates |
| 2017/0345398 A1 | 11/2017 | Fuchs et al. |
| 2017/0359570 A1 | 12/2017 | Holzer et al. |
| 2018/0039083 A1 | 2/2018 | Miller et al. |
| 2018/0047332 A1 | 2/2018 | Kuwahara |
| 2018/0053284 A1 | 2/2018 | Rodriguez et al. |
| 2018/0054712 A1 | 2/2018 | Ahuja et al. |
| 2018/0107346 A1 | 4/2018 | Wilson |
| 2018/0203235 A1 | 7/2018 | Fix et al. |
| 2018/0213359 A1 | 7/2018 | Reinhardt et al. |
| 2018/0267309 A1 | 9/2018 | Klug et al. |
| 2018/0268518 A1 | 9/2018 | Nourai et al. |
| 2018/0268519 A1 | 9/2018 | Liebenow et al. |
| 2018/0268610 A1 | 9/2018 | Nourai et al. |
| 2018/0301076 A1 | 10/2018 | Trythall |
| 2018/0315362 A1 | 11/2018 | Newton |
| 2018/0365882 A1 | 12/2018 | Croxsford et al. |
| 2019/0015167 A1 | 1/2019 | Draelos et al. |
| 2019/0056693 A1 | 2/2019 | Gelman et al. |
| 2019/0064526 A1 | 2/2019 | Connor |
| 2019/0066353 A1 | 2/2019 | Anderson et al. |
| 2019/0066365 A1 | 2/2019 | Schmalstieg et al. |
| 2019/0155374 A1 | 5/2019 | Miller et al. |
| 2019/0156504 A1 | 5/2019 | Jiang et al. |
| 2019/0333263 A1 | 10/2019 | Melkote Krishnaprasad et al. |
| 2019/0355176 A1 | 11/2019 | Evans |
| 2020/0005517 A1 | 1/2020 | Anderson et al. |
| 2020/0027194 A1 | 1/2020 | Nourai et al. |
| 2020/0184712 A1 | 6/2020 | Schmalstieg et al. |
| 2020/0209978 A1 | 7/2020 | Pahud et al. |

FOREIGN PATENT DOCUMENTS

| | | |
|---|---|---|
| AU | 2018234921 | 10/2021 |
| CA | 2142338 | 3/1994 |
| CA | 2358682 | 3/1994 |
| CN | 101093586 | 12/2007 |
| CN | 101530325 | 9/2009 |
| CN | 103792661 | 5/2014 |
| CN | 104011788 | 8/2014 |
| CN | 104866829 | 8/2015 |
| EP | 2887311 | 6/2015 |
| JP | 2007-128009 | 5/2007 |
| JP | 2012-43308 | 3/2012 |
| JP | 2012-96027 | 5/2012 |
| JP | 2015-52832 | 3/2015 |
| JP | 2016-528476 | 9/2016 |
| KR | 10-2014-0034252 | 3/2014 |
| KR | 10-2016-0013939 | 2/2016 |
| KR | 10-2016-0023888 | 2/2016 |
| WO | WO 94/04938 | 3/1994 |
| WO | WO 2009/091563 | 7/2009 |
| WO | WO 2014/160342 | 10/2014 |
| WO | WO 2015134958 | 9/2015 |
| WO | WO 2016 038240 | 3/2016 |
| WO | WO 2016141373 | 9/2016 |
| WO | WO 2017096396 | 6/2017 |
| WO | WO 2017136833 | 8/2017 |
| WO | WO 9720244 | 12/2019 |
| WO | WO 2020/023383 | 1/2020 |

OTHER PUBLICATIONS

Foreign Final OA for KR Patent Appln. No. 10-2019-7006281 dated Jan. 27, 2021.

Foreign Response for EP Patent Appln. No. 18742228.2 dated Feb. 11, 2021.

Foreign Response for EP Patent Appln. No. 18768030.1 dated Jan. 18, 2021.

Foreign OA for JP Patent Appln. No. 2019-539183 dated Feb. 19, 2021.

Foreign Exam Report for EP Patent Appln. No. 16871733.8 dated Jan. 11, 2021.

Final Office Action for U.S. Appl. No. 16/518,431 dated Mar. 2, 2021.

Foreign OA for JP Patent Appln. No. 2018-528977 dated Feb. 16, 2021.

(56) References Cited

OTHER PUBLICATIONS

Sumit Chopra et al., "Learning a Similarity Metric Discriminatively, with Application to Face Verification", 2005 IEEE Computer Society Conference on Computer Vision and Pattern Recognition (CVPR'05), US, IEEE, Jun. 20, 2005, vol. 1, pp. 539-546 (a document showing a well-known technique).
Florian Schroff et al., "FaceNet: A Unified Embedding for Face Recognition and Clustering", 2015 IEEE Conference on Computer Vision and Pattern Recognition (CVPR), US, IEEE, Jun. 7, 2015, pp. 815-823 (a document showing a well-known technique).
Foreign Exam Report for IN Patent Appln. No. 201747032796 dated Mar. 10, 2021.
Final Office Action for U.S. Appl. No. 16/945,613 dated Mar. 18, 2021.
Notice of Allowance for U.S. Appl. No. 16/809,346 dated Mar. 22, 2021.
Foreign OA for CN Patent Appln. No. 201780010073.0 dated Jan. 21, 2021.
Foreign Exam Report for AU Patent Appln. No. 2018233733 dated Mar. 11, 2021.
Foreign Exam Report for AU Patent Appln. No. 2018236457 dated Mar. 10, 2021.
Foreign Response for AU Patent Appln. No. 2018236457 dated Mar. 26, 2021.
Foreign Exam Report for AU Patent Appln. No. 2018234921 dated Mar. 11, 2021.
Foreign Response for AU Patent Appln. No. 2017214748 dated Mar. 29, 2021.
Foreign Exam Report for AU Patent Appln. No. 2018210015 dated Feb. 23, 2021.
Foreign Response for AU Patent Appln. No. 2018210015 dated Mar. 12, 2021.
Foreign Exam Report for NZ Patent Appln. No. 735465 dated Feb. 15, 2021.
Foreign Response for NZ Patent Appln. No. 735465 dated Mar. 31, 2021.
Foreign Response for AU Patent Appln. No. 2016225963 dated Mar. 31, 2021.
Foreign Response for EP Patent Appln. No. 18767086.4 dated Apr. 6, 2021.
Foreign Response for EP Patent Appln. No. 18766694.6 dated Apr. 6, 2021.
Foreign Notice of Acceptance for AU Patent Appln. No. 2018210015 dated Mar. 24, 2021.
Foreign NOA for IL Patent Appln. No. 267946 dated Apr. 7, 2021.
Foreign Response for JP Patent Appln. No. 2019-505238 dated Apr. 16, 2021.
Foreign OA for KR Patent Appln. No. 10-2017-7028140 dated Apr. 21, 2021.
Foreign Response for JP Patent Appln. No. 2018-540434 dated May 17, 2021.
Foreign Response for EP Patent Appln. No. 16871733.8 dated May 17, 2021.
Foreign Response for JP Patent Appln. No. 2019-539183 dated May 17, 2021.
Foreign Exam Report for EP Patent Appln. No. 16759643.6 dated Apr. 29, 2021.
Foreign Response for AU Patent Appln. No. 2016365422 dated May 14, 2021.
Foreign Response for JP Patent Appln. No. 2018-528977 dated May 13, 2021.
Foreign Response for CN Patent Appln. No. 201780010073.0 dated Jun. 4, 2021.
Notice of Allowance for U.S. Appl. No. 16/945,613 dated Jun. 9, 2021.
Foreign OA for CN Patent Appln. No. 201880018442.5 dated Apr. 1, 2021.
Non-Final Office Action for U.S. Appl. No. 17/022,317 dated Jun. 10, 2021.
Foreign Exam Report for IN Patent Appln. No. 201847023727 dated Jun. 15, 2021.
Foreign Amendment for KR Patent Appln. No. 10-2017-7028140 dated Jun. 15, 2021.
Foreign OA for IL Patent Appln. No. 260614 dated Mar. 22, 2021.
Foreign NOA for JP Patent Appln. No. 2019-539183 dated Jun. 21, 2021.
2nd Exam Report for EP Patent Appln. No. 17837488.0 dated May 28, 2021.
Non-Final Office Action for U.S. Appl. No. 16/518,431 dated Jun. 23, 2021.
Response to Final Office Action for U.S. Appl. No. 16/945,613, filed May 17, 2021.
RCE Response to Final Office Action for U.S. Appl. No. 16/518,431 dated Jun. 1, 2021.
Foreign FOA for JP Patent Appln. No. 2018-528977 dated Jun. 7, 2021.
Foreign NOA for IL Patent Appln. No. 254300 dated Apr. 22, 2021.
Foreign Response for IL Patent Appln. No. 254300 dated Mar. 14, 2021.
Foreign FOA for JP Patent Appln. No. 2018-540434 dated Jun. 14, 2021.
Foreign Exam Report for CA Patent Appln. No. 2979560 dated Jun. 15, 2021.
Foreign Exam Report for EP Patent Appln. No. 2016365422 dated Jun. 11, 2021.
Foreign OA for KR Patent Appln. No. 10-2019-7030322 dated Jul. 15, 2021.
Foreign OA for JP Patent Appln. No. 2019-550189 dated Jul. 13, 2021.
Foreign OA for JP Patent Appln. No. 2019-505238 dated Jul. 2, 2021.
Foreign Response for IL Patent Appln. No. 260614 dated Jul. 21, 2021.
Non-Final Office Action for U.S. Appl. No. 16/922,145 dated Jul. 22, 2021.
Notice of Allowance for U.S. Appl. No. 16/945,613 dated Aug. 3, 2021.
English Translation of Foreign OA for JP Patent Appln. No. 2019-550189 dated Jul. 8, 2021.
Foreign OA for JP Patent Appln. No. 2019-550231 dated Jul. 26, 2021.
Foreign OA for JP Patent Appln. No. 2019-550200 dated Jul. 26, 2021.
Foreign NOA for NZ Patent Appln. No. 735465 dated Jul. 22, 2021.
Foreign Response for CN Patent Appln. No. 201880018442.5 dated Aug. 12, 2021.
Foreign OA for CN Patent Appln. No. 201780010073.0 dated Jul. 9, 2021.
Foreign NOA for KR Patent Appln. No. 10-2017-7028140 dated Aug. 23, 2021.
Foreign Exam Report for IN Patent Appln. No. 201947005860 dated Aug. 18, 2021.
Decision to Grant for EP Patent Appln. No. 18742228.2 dated Aug. 19, 2021.
Foreign Exam Report for AU Patent Appln. No. 2021204725 dated Aug. 24, 2021.
Foreign NOA for JP Patent Appln. No. 2018-548394 dated Sep. 7, 2021.
Foreign Response for EP Patent Appln. No. 16759643.6 dated Sep. 3, 2021.
Non-Final Office Action for U.S. Appl. No. 14/641,376 dated Apr. 14, 2016.
Final Office Action for U.S. Appl. No. 14/641,376 dated Nov. 14, 2016.
PCT International Search Report and Written Opinion for International Appln. No. PCT/US15/19339, Applicant Magic Leap, Inc., Forms PCT/ISA/210, 220, and 237, dated Jun. 24, 2015 (10 pages).
PCT International Search Report and Written Opinion for International Appln. No. PCT/US16/21095, Applicant Magic Leap, Inc., forms PCT/ISA/210, 220, and 237, dated May 31, 2016 (12 pages).

(56) References Cited

OTHER PUBLICATIONS

PCT International Search Report and Written Opinion for International Appln. No. PCT/US16/65001, Applicant Magic Leap, Inc., forms PCT/ISA/210, 220, and 237, dated Feb. 16, 2017 (16 pages).
PCT International Search Report and Written Opinion for International Appln. No. PCT/US2017/016722, Applicant Magic Leap, Inc., forms PCT/ISA/210, 220, and 237, dated Apr. 14, 2017 (24 pages).
Non-Final Office Action dated Dec. 6, 2017 for U.S. Appl. No. 15/062,104.
Response to Non-Final office action filed Mar. 6, 2018 for U.S. Appl. No. 15/062,104.
Final Office Action filed Apr. 30, 2018 for U.S. Appl. No. 15/062,104.
Coiliot, C., Moutoussamy, J., Boda, M., and Leroy, P.: New ferromagnetic core shapes for induction sensors, J. Sens. Sens. Syst., 3,1-8, https://doi.org/10.5194/jsss-3-1-2014, 2014.
Pre appeal brief filed Aug. 30, 2018 for U.S. Appl. No. 15/062,104.
Reply brief filed May 6, 2019 for U.S. Appl. No. 15/062,104.
Response to Non-Final office action filed Sep. 12, 2016 for U.S. Appl. No. 14/641,376.
Response to Final Office action filed Mar. 14, 2017 for U.S. Appl. No. 14/641,376.
Notice of Allowance dated Aug. 14, 2017 for U.S. Appl. No. 14/641,376.
Preliminary Amendment filed Aug. 24, 2017 for U.S. Appl. No. 15/425,837.
Voluntary Amendment for Canadian Appln. No. 2979560 filed Oct. 6, 2017, 24 pages.
Voluntary Amendment for Japanese Appln. No. 2017-546703 filed Nov. 7, 2017, 7 pages.
Non-Final Office Action dated Apr. 5, 2018 for U.S. Appl. No. 15/425,837.
Response to Non-Final Office Action filed Jul. 5, 2018 for U.S. Appl. No. 15/425,837.
Notice of Allowance dated Sep. 6, 2018 for U.S. Appl. No. 15/425,837.
Extended European Search Report dated Oct. 16, 2018 for EP Application No. 16759643.6.
Amendment After Allowance dated Nov. 15, 2018 for U.S. Appl. No. 15/425,837.
Non final Office Action dated Nov. 29, 2018 for U.S. Appl. No. 15/369,646.
Extended European Search Report dated Jan. 7, 2019 for EP Application No. 16871733.8.
Song Yafei et al.: Fast Estimation of Relative Poses for 6-DOF Image Localization, 2015 IEEE International Conference on Multimedia Big Data, IEEE; Apr. 20, 2015, pp. 156-163, XP033173496.
Ng Joe Yue-Hei et al.: Exploiting local features from deep networks for image retrieval, 2015 IEEE Conference on Computer Vision and Pattern recognition workshops (CVPRW), IEEE; Jun. 7, 2015, pp. 53-61, XP032795533.
Bay Herbert et al.: SURF: Speeded Up Robust Features, International Conference on Simulation, Modeling and Programming for Autonomous Robots, Simpar 2010, Lecture Notes in Computer Science; Lect Notes Computer; May 7, 2006, pp. 404-417, XP047429677.
Alex Kendall et al.: PoseNet: A Convolutional Metwork for Real-Time 6-DOF Camera Relocalization,https://arxiv.org/pdf/1505.07427v3.pdf, Nov. 23, 2015; XP055536871.
Extended European Search Report dated Jan. 17, 2019 for EP Application No. 17748352.6.
Nair Rahul et al.: "A Survey on Time-of-Flight Stero Fusion", Oct. 9, 2015, Medical Image Computing and Computer Assisted Intervention—MICCAI 2015, 18th International Conference, Munich, Germany, Oct. 5-9, 2015; Proceedings; Lecture Notes in Computer Science; Leet Notes Computer; Springer International Publishing, CH, XP047148654.

Zhu J J et al.: Joint depth and alpha matte optimization via fusion of stero and time-of-flight sensor, 2009 IEEE Conference on Computer Vision and Pattern recognition (CVPR), IEEE; Jun. 20, 2009, pp. 453-460, XP002700137.
Amendment After Non-Final Office Action dated Feb. 28, 2019 for U.S. Appl. No. 15/369,646.
PCT International Search Report and Written Opinion for International Appln. No. PCT/US18/22884, Applicant Magic Leap, Inc., forms PCT/ISA/210, 220, and 237, dated May 21, 2018 (13 pages).
Non-Final Office Action for U.S. Appl. No. 15/923,560 dated Jan. 2, 2019.
Amendment Response to Non-Final Office Action for U.S. Appl. No. 15/923,560 dated Apr. 1, 2019..
PCT International Search Report and Written Opinion for International Appln. No. PCT/US18/22993, Applicant Magic Leap, Inc., forms PCT/ISA/210, 220, and 237, dated Jun. 8, 2018 (13 pages).
PCT Invitation to Pay Additional Fees for International Appln. No. PCT/US18/23011, Applicant Magic Leap, Inc. dated May 25, 2018 (18 pages).
PCT International Search Report and Written Opinion for International Appln. No. PCT/US18/23011, Applicant Magic Leap, Inc. dated Jul. 23, 2018 (18 pages).
Non-Final Office Action for U.S. Appl. No. 15/924,078 dated Mar. 21, 2019.
Response to Extended European Search Report dated May 13, 2019 for EP Application No. 16759643.6.
Non Final Office action dated Jun. 17, 2019 for U.S. Appl. No. 15/924,011.
Tian et al., View Synthesis Techniques for 3D Video, Proc. SPIE 7443, Applications of Digital Image Processing XXXII, 74430T, Sep. 2009 (Year: 2009).
Final Office Action dated Jun. 21, 2019 for U.S. Appl. No. 15/369,646.
Response to Non-Final Office Action filed Jun. 21, 2019 for U.S. Appl. No. 15/924,078.
Response to Restriction Requirement filed Jul. 22, 2019 for U.S. Appl. No. 15/877,359.
Final Office Action for U.S. Appl. No. 15/923,560 dated Jul. 11, 2019.
Non-Final Office Action for U.S. Appl. No. 15/665,335 dated Apr. 22, 2019.
Response to Non-Final Office Action for U.S. Appl. No. 15/665,335 dated Jul. 22, 2019.
Response to Restriction Requirement filed Mar. 18, 2019 for U.S. Appl. No. 15/665,335.
PCT International Search Report and Written Opinion for International Patent Appln. No. PCT/US2017/044762 dated Oct. 5, 2017 (8 pages).
Response to Extended European Search Report dated Jul. 30, 2019 for European Application No. 16871733.8, (12 pages).
Final Office Action for U.S. Appl. No. 15/924,078 dated Aug. 9, 2019.
Response to Final Office Action and AFCP for U.S. Appl. No. 15/369,646, filed Aug. 21, 2019.
Response Non Final Office action filed Sep. 12, 2019 for U.S. Appl. No. 15/924,011.
Advisory Action dated Sep. 6, 2019 for U.S. Appl. No. 15/369,646.
RCE and Response to Final Office Action for U.S. Appl. No. 15/369,646, filed Sep. 19, 2019.
Office Action for Chinese Appln. No. 201680025479.1 dated Jul. 23, 2019, 16 pages w/English translation.
Response to Final Office Action and AFCP for U.S. Appl. No. 15/924,078, filed Oct. 9, 2019.
Response to Final Office Action for U.S. Appl. No. 15/923,560, filed Oct. 10, 2019.
1st Examination Report dated Oct. 1, 2019 for European Application No. 16759643.6.
Non-Final Office Action dated Oct. 21, 2019 for U.S. Appl. No. 15/877,359.
Final office action dated Oct. 22, 2019 for U.S. Appl. No. 15/924,011.
Advisory Action dated Oct. 22, 2019 for U.S. Appl. No. 15/924,078.
Non-Final Office Action dated Oct. 30, 2019 for U.S. Appl. No. 16/220,617.

(56) References Cited

OTHER PUBLICATIONS

Non-Final Office Action dated Oct. 31, 2019 for U.S. Appl. No. 15/923,560.
RCE and Response to Final Office Action filed Nov. 11, 2019 for U.S. Appl. No. 15/924,078.
Non Final Office Action dated Nov. 8, 2019 for U.S. Appl. No. 15/369,646.
Office Action for Israeli Appln. No. 254300 dated Oct. 27, 2019, 7 pages w/English translation.
Response to Office Action for Chinese Appln. No. 201680025479.1 filed Nov. 26, 2019, 9 pages w/English translation of claims.
Extended European Search Report dated Nov. 21, 2019 for European Application No. 18767086.4.
Extended European Search Report for European Appln. No. 17837488.0 dated Jul. 11, 2019 (10 pages).
Robert Earl Patterson, et al. "Low-Level Factors in Human Factors of Stereoscopic 3D Displays", ProQuest Ebook Central, Springer, London, Dec. 29, 2014. doi:10.1007/978-1-4471-6651-1_4, chapter 4.2; 4.3.
Jannick Rolland, et al. "The past, present and future of head-mounted display designs"; Nov. 8, 2004, Proc. SPIE 5638, p. 368.
RCE and Response to Final Office Action for U.S. Appl. No. 15/665,335, filed Dec. 4, 2019.
PCT International Search Report and Written Opinion for International Patent Appln. No. PCT/US2019/042819, dated Dec. 4, 2019 (12 pages).
PCT Invitation to Pay Additional Fees for International Patent Appln. No. PCT/US2019/042819, dated Sep. 18, 2019 (2 pages).
Lee, Y., et al., "Estimating Gaze Depth Using Multi-Layer Perceptron," Published by IEEE, retrived electronically on Apr. 12, 2019 (5 pages).
Extended European Search Report for European Appln. No. 18766694.6 dated Nov. 21, 2019 (9 pages).
Theohari S Theohari S et al. "The Magic of the Z-Buffer: A Survey", Journal of WSCG, Plzen, Czech Republic, Feb. 5, 2001, XP55640849.
Amir H. Behzadan et al: "Scalable 1-14 Algorithm for Resolving Incorrect Occlusion in Dynamic Augmented Reality Engineering Environments : Scalable algorithm for resolving incorrect occlusion", Computer-Aided Civil and Infrastructure Engineering, vol. 25, No. I, Jan. 1, 2010, pp. 3-19, XP55640847.
Breen D E et al: "Interactive occlusion 1-14 and automatic object placement for augmented reality", Computer Graphics Forum, Wiley-Blackwell Publishing Ltd, GB, vol. 15, No. 3, Aug. 26, 1996, pp. 11-22, XP002515919.
Mark WR et al: "Post-Rendering 3D 1-14 Warping", Proceedings of 1997 Symposium on Interactive 3 D Graphics Apr. 27-30, 1997 Providence, RI, USA; ACM, New York, NY, USA, Apr. 27, 1997, pp. 7-16, XP000725355.
Amendment After Final Office Action for U.S. Appl. No. 15/924,011 dated Dec. 19, 2019.
Non-Final Office Action for U.S. Appl. No. 16/22,630 dated Dec. 26, 2019.
Non-Final Office Action for U.S. Appl. No. 15/924,078 dated Jan. 13, 2020.
Extended European Search Report for European Appln. No. 18742228.2 dated Jan. 13, 2020 (8 pages).
Amendment After non-final Office Action for U.S. Appl. No. 15/877,359 dated Jan. 21, 2020.
Notice of Allowance for U.S. Appl. No. 15/924,011 dated Jan. 23, 2020.
Response to Extended European Search Report for European Appln. No. 17837488.0 filed Jan. 28, 2020 (23 pages).
Amendment After non-final Office Action for U.S. Appl. No. 16/220,617 dated Jan. 30, 2020.
Amendment After non-final Office Action for U.S. Appl. No. 15/923,560 dated Jan. 31, 2020.
Response to Examination Report filed Feb. 11, 2020 for European Application No. 16759643.6.
Amendment After non-final Office Action for U.S. Appl. No. 15/369,646 dated Feb. 10, 2020.
Notice of Allowance for U.S. Appl. No. 16/220,617 dated Feb. 20, 2020.
Response to Office Action filed Feb. 20, 2020 for Israeli Patent Application No. 254300, (3 pages).
Foreign Office Action for Japanese Patent Appln. No. 2017-546703 dated Mar. 10, 2020.
Amendment After non-final Office Action for U.S. Appl. No. 15/924,078 dated Apr. 13, 2020.
Notice of Allowance for U.S. Appl. No. 15/369,646 dated Apr. 8, 2020.
Final Office Action for U.S. Appl. No. 15/877,359 dated Apr. 16, 2020.
Foreign Office Action for Israeli Patent Application No. 259766 dated Mar. 1, 2020.
Amendment After non-final Office Action for U.S. Appl. No. 16/220,630 dated Apr. 27, 2020.
Non-Final Office Action for U.S. Appl. No. 16/848,496 dated May 18, 2020.
Notice of Allowance for U.S. Appl. No. 15/923,560 dated May 19, 2020.
Notice of Allowance for U.S. Appl. No. 15/924,078 dated May 18, 2020.
Foreign Office Action for CN Patent Appln. No. 201680025479.1 dated Apr. 7, 2020.
Jiang, P., etc., "Electro-magnetic Tracking System for Capsule-typed Telemetric Device", Optics and Precision Engineering, vol. 15, No. 8, pp. 1247-1252, Aug. 2007.
1st Examination Report dated Jun. 24, 2020 for New Zealand Patent Application No. 743271.
Foreign Office Action for CN Patent Appln. No. 201680025479.1 dated Jun. 18, 2020.
Notice of Allowance for U.S. Appl. No. 16/220,630 dated Jun. 8, 2020.
Response to Extended European Search Report for European Appln. No. 18767086.4 filed Jun. 15, 2020 (84 pages).
Response to Extended European Search Report for European Appln. No. 18766694.6 filed Jun. 19, 2020 (78 pages).
1st Examiner's Report for AU European Patent Appln. No. 2016225963 dated Jul. 1, 2020.
Foreign Office Action Response for JP Patent Appln. No. 2017-546703 dated Jun. 1, 2020.
Extended European Search Report for EP Patent Appln. No. 18768030.1 dated Jun. 18, 2020.
Mark, W., et al., "Post-Rendering 3D Warping", Proceedings of 1997 Symposium on 3D Graphics, Apr. 27-30, 1997, Providence, RI, USA, p. 7-ff, XP058285072.
Amendment Response to Non-Final Office Action for U.S. Appl. No. 16/848,496 dated Jul. 22, 2019.
Foreign Exam Report for NZ Patent Appln. No. 735465 dated Jul. 22, 2020.
1st Examination Report for NZ Patent Appln. No. 734200 dated Jun. 15, 2020.
Foreign Submission Reply for EP Patent Appln No. 18766694.6 dated Jun. 19, 2020.
Foreign Examination Report for EP Patent Appln. No. 17837488.0 dated Jul. 22, 2020.
Response to Extended European Search Report for European Appln. No. 18742228.2 dated Aug. 10, 2020 (86 pages).
Notice of Allowance for U.S. Appl. No. 15/923,560 dated Aug. 25, 2020.
Notice of Allowance for U.S. Appl. No. 16/848,496 dated Aug. 24, 2020.
Foreign Office Action for KR Patent Appln. No. 10-2019-7006281 dated Aug. 28, 2020.
Non-Final Office Action for U.S. Appl. No. 16/945,613 dated Sep. 3, 2020.
Notice of Allowance for U.S. Appl. No. 16/220,630 dated Sep. 11, 2020.
Foreign Office Action for JP Patent Application No. 2019-505238 dated Sep. 10, 2020 (no translation available).
Notice of Allowance for U.S. Appl. No. 15/369,646 dated Sep. 22, 2020.

(56) References Cited

OTHER PUBLICATIONS

Notice of Allowance for U.S. Appl. No. 16/220,630 dated Sep. 23, 2020.
Non-Final Office Action for U.S. Appl. No. 16/809,346 dated Oct. 16, 2020.
1st Examination Report for AU Patent Appln. No. 2017214748 dated Oct. 14, 2020.
Non-Final Office Action for U.S. Appl. No. 16/518,431 dated Oct. 27, 2020.
Foreign Exam Report for EP Patent Appln. No. 18767086.4 dated Sep. 23, 2020.
Foreign Exam Report for EP Patent Appln. No. 18766694.6 dated Sep. 23, 2020.
N Stewart et al: "An improved z-buffer CSG rendering algorithm", Proceedings of the Eurographics / SIGGRAPH Workshop on Graphics Hardware. Lisbon, Aug. 31-Sep. 1, 1998; pp. 25-30, XP058111343.
Wolberg G et al.: "Separable image warping with spatial lookup tables", Computer Graphics, ACM, US, vol. 23, No. 3, Jul. 1, 1989, pp. 369-378, XP058214788.
R T Stevens: "Primitive", In: "Quick Reference to Computer Graphics Terms A Division of Harcourt Brace & Company", Jan. 1, 1995, XP55730228, p. 166.
J D Foley: "The z-buffer algorithm", In: "Computer Graphics—Principles and Practice", Addison-Wesley, Jan. 1, 1990 (Jan. 1, 1990), XP55731635, pp. 668-672.
Notice of Allowance for U.S. Appl. No. 16/848,496 dated Nov. 2, 2020.
Foreign OA Response for KR Patent Appln. No. 10-2019-7006281 dated Oct. 28, 2020.
Notice of Allowance for U.S. Appl. No. 16/938,578 dated Nov. 19, 2020.
Foreign Exam Report for EP Patent Appln. No. 18742228.2 dated Oct. 1, 2020.
Foreign OA Response for EP Patent Appln. No. 17837488.0 dated Nov. 20, 2020.
Foreign OA Response for IL Patent Application No. 259766 dated Nov. 25, 2020.
1st Exam Report for AU Patent Application No. 2016365422 dated Nov. 4, 2020.
Foreign OA Response for JP Patent Application No. 2019-505238 dated Dec. 1, 2020.
Response to Non-Final Office Action for U.S. Appl. No. 16/945,613 filed Dec. 3, 2020.
Foreign Final OA for JP Patent Appln. No. 2017-546703 dated Nov. 20, 2020.
Foreign OA for KR Patent Appln. No. 10-2019-7006281 dated Dec. 15, 2020.
Foreign Exam Report for AU Patent Appln. No. 2017305227 dated Dec. 16, 2020.
Foreign NOA for IL Patent Application No. 259766 dated Nov. 29, 2020.
Amendment Response to NFOA for U.S. Appl. No. 16/809,346 dated Jan. 11, 2020.
Foreign OA For JP Patent Appln. No. 2019-505238 dated Jan. 12, 2021.
Foreign OA for JP Patent Appln. No. 2018-540434 dated Dec. 17, 2020.
Response to Non-Final Office Action for U.S. Appl. No. 16/518,431, filed Jan. 27, 2021.
Foreign Response for JP Patent Appln. No. 2019-510409 dated Jan. 28, 2021.
Foreign OA for IL Patent Appln. No. 254300 dated Nov. 15, 2020.
Foreign Response for NZ Patent Appln. No. 735465 dated Jan. 21, 2021.
Foreign Response for IN Patent Appln. No. 201747032796 dated Sep. 8, 2021.
Foreign Response for AU Patent Appln. No. 2018234921 dated Sep. 15, 2021.
Foreign Response for KR Patent Appln. No. 10-2019-7030322 dated Sep. 13, 2021.
Foreign Response for KR Patent Appln. No. 10-2019-7030321 dated Sep. 10, 2021.
Foreign Response for AU Patent Appln. No. 2016365422 dated Sep. 16, 2021.
Foreign Response for CN Patent Appln. No. 201780010073.0 dated Sep. 22, 2021.
Foreign Response for JP Patent Appln. No. 2019-505238 dated Sep. 27, 2021.
Foreign Response for KR Patent Appln. No. 10-2019-7029900 dated Sep. 17, 2021.
Foreign Exam Report for IN Patent Appln. No. 201847025793 dated Sep. 22, 2021.
Foreign Response for AU Patent Appln. No. 2018233733 dated Oct. 1, 2021.
Foreign NOA for JP Patent Appln. No. 2019-505238 dated Oct. 5, 2021.
Foreign Response for EP Patent Appln. No. 17837488.0 dated Oct. 5, 2021.
Notice of Allowance for U.S. Appl. No. 17/022,317 dated Oct. 6, 2021.
Foreign Response for JP Patent Appln. No. 2019-550189 dated Oct. 8, 2021.
Foreign Notice of Acceptance for AU Patent Appln. No. 2018234921 dated Sep. 27, 2021.
3rd Exam Report for AU Patent Appln. No. 2016365422 dated Oct. 11, 2021.
Foreign Notice of Appeal for JP Patent Appln. No. 2018-540434 dated Oct. 13, 2021.
Foreign Exam Report for EP Patent Appln. No. 18767086.4 dated Sep. 1, 2021.
Foreign Response for CA Patent Appln. No. 2979560 dated Oct. 13, 2021.
Foreign NOA for IL Patent Appln. No. 268916 dated Sep. 12, 2021.
Amendment Response to NFOA for U.S. Appl. No. 16/922,145 dated Oct. 18, 2021.
Foreign Response for AU Patent Appln. No. 2016365422 dated Oct. 22, 2021.
Foreign Response for JP Patent Appln. No. 2019-550200 dated Oct. 22, 2021.
Foreign Response for JP Patent Appln. No. 2019-550231 dated Oct. 22, 2021.
Extended European Search Report for EP Patent Appln. No. 19840248.9 dated Sep. 29, 2021.
Schmeing Michael et al: "Faithful Disocclusion Filling in Depth Image Based Rendering Using Superpixel-Based Inpainting", IEEE Transactions on Multimedia, IEEE Service Center, US, vol. 17, No. 12, Dec. 1, 2015(Dec. 1, 2015), pp. 2160-2173, XP011589953, ISSN: 1520-9210, DOI: 10.1109/TMM.2015.2476372 [retrieved on Nov. 13, 2015].
Foreign Exam Report for EP Patent Appln. No. 18766694.6 dated Sep. 24, 2021.
Foreign NOA for IL Patent Appln. No. 268911 dated Oct. 27, 2021.
Non-Final Office Action for U.S. Appl. No. 17/091,278 dated Nov. 18, 2021.
Notice of Allowance for U.S. Appl. No. 16/518,431 dated Nov. 17, 2021.
Foreign NOA for KR Patent Appln. No. 10-2019-7030321 dated Nov. 4, 2021.
Notice of Allowance for U.S. Appl. No. 16/922,145 dated Nov. 19, 2021.
Notice of Allowance for U.S. Appl. No. 16/937,510 dated Dec. 1, 2021.
Foreign NOA for KR Patent Appln. No. 10-2019-7029900 dated Nov. 18, 2021.
Foreign NOA for KR Patent Appln. No. 10-2019-7030322 dated Nov. 18, 2021.
Foreign OA for CN Patent Appln. No. 201780010073.0 dated Oct. 29, 2021.
Foreign NOA for IL Patent Appln. No. 268962 dated Nov. 28, 2021.
Foreign Response for EP Patent Appln. No. 18742228.2 dated Dec. 7, 2021.
Foreign OA for CN Patent Appln. No. 201680080997.3 dated Sep. 29, 2021.

(56) References Cited

OTHER PUBLICATIONS

2nd Exam Report for CA Patent Appln. No. 2979560 dated Nov. 25, 2021.
Foreign NOA for JP Patent Appln. No. 2019-550189 dated Dec. 14, 2021.
Foreign NOA for JP Patent Appln. No. 2019-550200 dated Dec. 14, 2021.
Non-Final Office Action for U.S. Appl. No. 17/178,524 dated Dec. 15, 2021.
Foreign NOA for AU Patent Appln. No. 2017305227 dated Dec. 1, 2021.
Foreign OA for JP Patent Appln. No. 2019-550231 dated Dec. 14, 2021.
Notice of Allowance for U.S. Appl. No. 17/022,317 dated Dec. 22, 2021.
Foreign Response for CN Patent Appln. No. 201780010073.0 dated Dec. 31, 2021.
Foreign Exam Report for IN Patent Appln. No. 201947030779 dated Jan. 4, 2022.
Foreign Response for EP Patent Appln. No. 18767086.4 dated Jan. 11, 2022.
Foreign NOA for CN Patent Appln. No. 201880018442.5 dated Jan. 12, 2022.
Foreign Exam Report for IN Patent Appln. No. 201947040457 dated Feb. 3, 2022.
Foreign Exam Report for IN Patent Appln. No. 201947040458 dated Feb. 4, 2022.
Foreign Exam Report for IN Patent Appln. No. 201947040852 dated Feb. 1, 2022.
Foreign OA for KR Patent Appln. No. 10-2021-7006131 dated Feb. 9, 2022 (with English translation).
Amendment Response to NFOA for U.S. Appl. No. 17/091,278 dated Feb. 18, 2022.
Foreign OA for JP Patent Appln. No. 2017-546703 dated Feb. 3, 2022 (with English translation).
Notice of Allowance for U.S. Appl. No. 16/518,431 dated Feb. 24, 2022.
Foreign OA for JP Patent Appln. No. 2022-002800 dated Feb. 8, 2022 (with English translation).
Foreign Response for JP Patent Appln. No. 2019-550231 dated Mar. 8, 2022.
Foreign OA for JP Patent Appln. No. 2022-2802 dated Feb. 8, 2022 (with English translation).
Foreign NOA for JP Patent Appln. No. 2019-550231 dated Mar. 11, 2022.
Amendment Response to NFOA for U.S. Appl. No. 17/178,524 dated Mar. 15, 2022.
Foreign Response for CA Patent Appln. No. 2979560 dated Mar. 24, 2022.
Notice of Allowance for U.S. Appl. No. 17/091,278 dated Mar. 28, 2022.
Foreign Summons for Oral Proceedings for EP Patent Appln. No. 16871733.8 dated Mar. 15, 2022.
Foreign Response for IN Patent Appln. No. 201847025793 dated Mar. 21, 2022.
Foreign Response for EP Patent Appln. No. 18766694.6 dated Apr. 4, 2022.
Notice of Allowance for U.S. Appl. No. 17/178,524 dated Apr. 6, 2022.
Foreign Exam Report for AU Patent Appln. No. 2022201750 dated Apr. 6, 2022.
Foreign Exam Report for AU Patent Appln. No. 2021290369 dated Mar. 29, 2022.
Foreign NOA for IL Patent Appln. No. 264489 dated Mar. 21, 2022.
Foreign Response for KR Patent Appln. No. 10-2021-7006131 dated Apr. 11, 2022.
Non-Final Office Action for U.S. Appl. No. 17/353,434 dated Apr. 28, 2022.
Foreign Response for EP Patent Appln. No. 19840248.9 dated Apr. 29, 2022.
Foreign NOA for CN Patent Appln. No. 201780010073.0 dated Apr. 6, 2022.
Foreign NOA for IL Patent Appln. No. 260614 dated Mar. 16, 2022.
Foreign Response for JP Patent Appln. No. 2017-546703 dated May 5, 2022.
Foreign Response for JP Patent Appln. No. 2022-2802 dated May 9, 2022.
Foreign Response for JP Patent Appln. No. 2022-2800 dated May 9, 2022.
Extended European Search Report for EP Patent Appln. No. 21196532.2 dated Mar. 28, 2022.
Foreign NOA for JP Patent Appln. No. 2022-2800 dated May 24, 2022.
Foreign NOA for JP Patent Appln. No. 2022-2802 dated May 24, 2022.
Foreign Response for JP Patent Appln. No. 2021-41375 dated May 30, 2022.
Foreign OA for JP Patent Appln. No. 2021-116964 dated Jun. 6, 2022.
Foreign Exam Report for AU Patent Appln. No. 2022200841 dated May 19, 2022.
Foreign Examiner's Report for CA Patent Appln. No. 2979560 dated May 31, 2022.
Foreign Response for AU Patent Appln. No. 2021204725 dated Jul. 15, 2022.
Foreign NOA for IL Patent Appln. No. 284939 dated May 31, 2022.

* cited by examiner

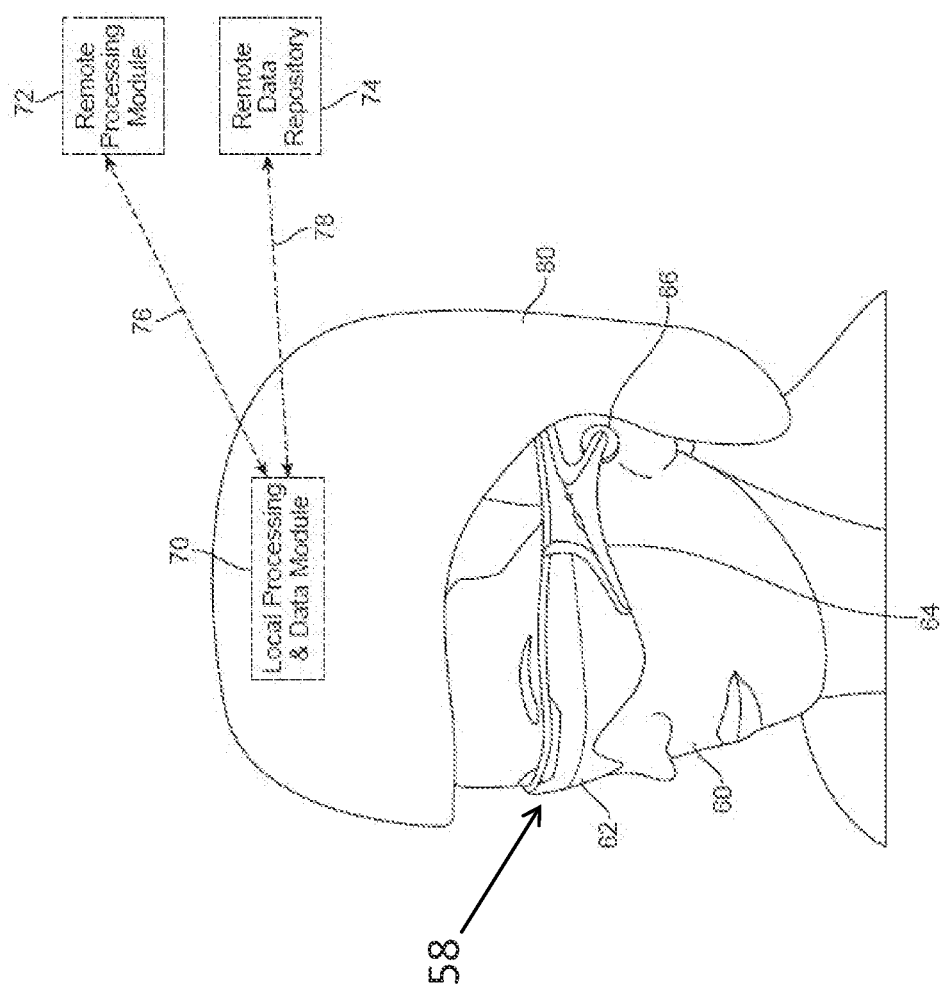

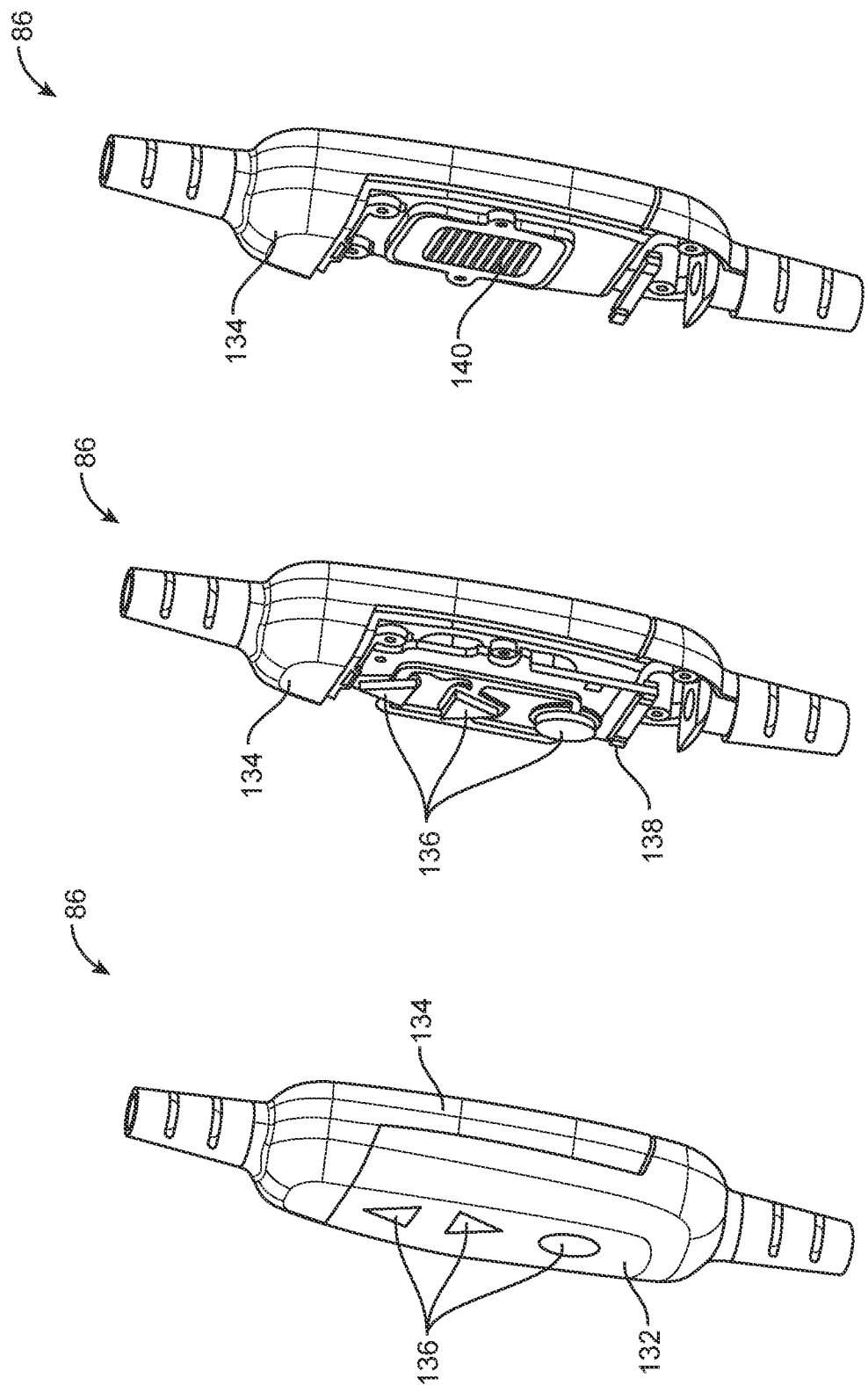

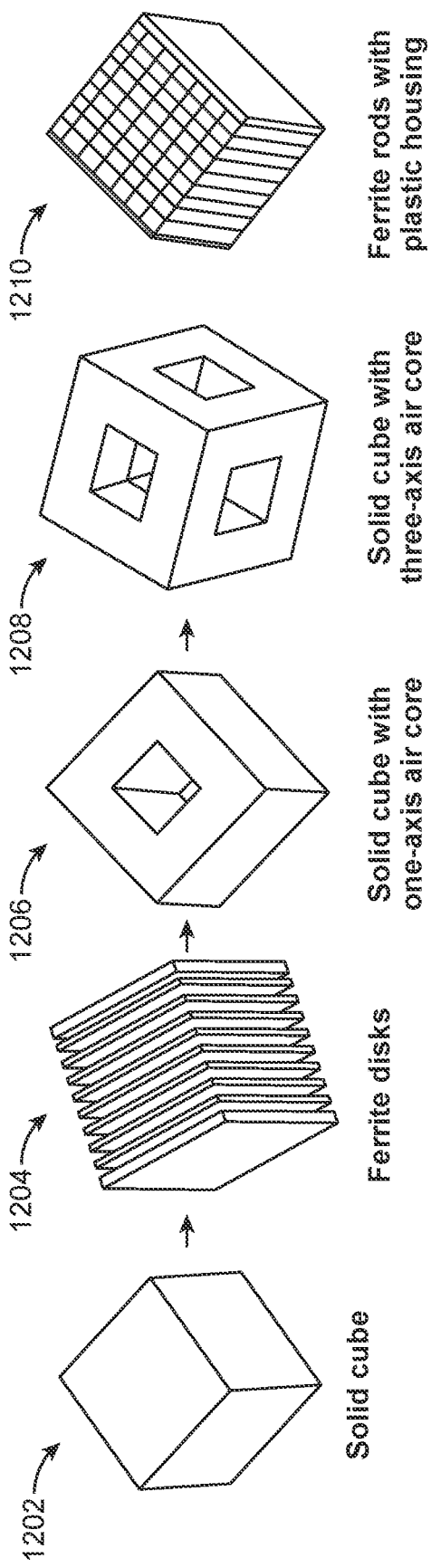

SYSTEMS AND METHODS FOR AUGMENTED REALITY

CROSS-REFERENCE TO RELATED APPLICATION(S)

The present application is a continuation of pending U.S. patent application Ser. No. 15/062,104, filed Mar. 5, 2016, entitled, "SYSTEMS AND METHODS FOR AUGMENTED REALITY," which claims priority to U.S. Provisional Application Ser. No. 62/128,993 filed on Mar. 5, 2015 entitled, "ELECTROMAGNETIC TRACKING SYSTEM AND METHOD FOR AUGMENTED REALITY," and U.S. Provisional Application Ser. No. 62/292,185 filed on Feb. 5, 2016 entitled, "SYSTEMS AND METHODS FOR AUGMENTED REALITY,". The contents of the above listed patent applications are hereby incorporated by reference in their entirety as though set forth in full.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input. An augmented reality, or "AR", scenario typically involves presentation of digital or virtual image information as an augmentation to visualization of the actual world around the user.

For example, referring to FIG. 1, an augmented reality scene 4 is depicted wherein a user of an AR technology sees a real-world park-like setting 6 featuring people, trees, buildings in the background, and a concrete platform 1120. In addition to these items, the user of the AR technology may also perceive a robot statue 1110 standing upon the real-world platform 1120, and a cartoon-like avatar character 2 flying around the park. Of course, the virtual elements 2 and 1110 do not exist in the real world, but the user perceives these virtual objects as being part of, and as interacting with objects of the real world (e.g., 6, 1120, etc.). It should be appreciated, the human visual perception system is very complex, and producing such an AR scene that facilitates a comfortable, natural-feeling, rich presentation of virtual image elements amongst other virtual or real-world imagery elements is challenging.

For instance, head-worn AR displays (e.g., helmet-mounted displays, or smart glasses) may be coupled to a user's head, and thus may move when the user's head moves. If the user's head motions are detected by the display system, the data being displayed can be updated to take the change in head pose into account. The head pose may be utilized to appropriately render virtual content to the user. Thus any small variation may disrupt and/or diminish the delivery or timing of virtual content that is delivered to the user's AR display.

As an example, if a user wearing a head-worn display views a virtual representation of a three-dimensional (3-D) object on the display and walks around the area where the 3-D object appears, that 3-D object can be re-rendered for each viewpoint, giving the user the perception that he or she is walking around an object that occupies real space. If the head-worn display is used to present multiple objects within a virtual space (for instance, a rich virtual world), measurements of head pose (i.e., the location and orientation of the user's head) can be used to re-render the scene to match the user's dynamically changing head location and orientation, and provide an increased sense of immersion in the virtual space. Similarly, when a user of AR technology is interacting with the virtual world, he or she may use an object or his/her hand to point to objects or to select options. In order for this interaction to occur, localization of the object or the user's hand to an accurate degree is also important. Thus, both head pose, and "hand pose" are both crucial, and localization techniques must be used in order to accurately depict virtual content to the user.

In AR systems, detection and/or calculation of head pose and/or hand pose can facilitate the AR display system to render virtual objects such that they appear to occupy a space in the real world in a manner that is congruent to the objects of the real world. Presenting an AR scene realistically such that the virtual content does not seem jarring/disorienting in relation to one or more real objects improves the user's enjoyment of the AR experience. In addition, detection of the position and/or orientation of a real object, such as a handheld device (which also may be referred to as a "totem"), haptic device, or other real physical object, in relation to the user's head or AR system may also facilitate the display system in presenting display information to the user to enable the user to interact with certain aspects of the AR system efficiently.

It should be appreciated that in AR applications, placement of virtual objects in spatial relation to physical objects (e.g., presented to appear spatially proximate a physical object in two or three dimensions) is a non-trivial problem. For example, head movement may significantly complicate placement of virtual objects in a view of an ambient environment. This may be true whether the view is captured as an image of the ambient environment and then projected or displayed to the end user, or whether the end user perceives the view of the ambient environment directly. For instance, head movement may cause the field of view of the user to change. This may, in turn, require an update to where various virtual objects are displayed in the field of view of the end user. Similarly, movement of the hand (in case of a handheld object) when used to interact with the system provides the same challenge. These movements may be fast and typically need to be accurately detected and localized at a high refresh rate and low latency.

Additionally, head and/or hand movements may occur at a large variety of ranges and speeds. The speed may vary not only between different types of head movements, but within or across the range of a single movement. For instance, speed of head movement may initially increase (e.g., linearly or otherwise) from a starting point, and may decrease as an ending point is reached, obtaining a maximum speed somewhere between the starting and ending points of the head movement. Rapid movements may even exceed the ability of the particular display or projection technology to render images that appear uniform and/or as smooth motion to the end user.

Head or hand tracking accuracy and latency (i.e., the elapsed time between when the user moves his or her head/hand and the time when the image gets updated and displayed to the user) have been challenges for VR and AR systems. Especially for display systems that fill a substantial portion of the user's visual field with virtual elements, it is critical that the accuracy of tracking is high and that the overall system latency is very low from the first detection of motion to the updating of the light that is delivered by the display to the user's visual system. If the latency is high, the system can create a mismatch between the user's vestibular and visual sensory systems, and generate a user perception scenario that can lead to motion sickness or simulator sickness. If the system latency is high, the apparent location of virtual objects may appear unstable during rapid head motions.

In addition to head-worn display systems, other display systems can also benefit from accurate and low-latency head pose detection. These may include head-tracked display systems in which the display is not worn on the user's body, but is, e.g., mounted on a wall or other surface. The head-tracked display may act like a window onto a scene, and as a user moves his head relative to the "window" the scene is re-rendered to match the user's changing viewpoint. Other systems may include a head-worn projection system, in which a head-worn display projects light onto the real world.

Additionally, in order to provide a realistic AR experience, AR systems may be designed to be interactive with the user. For example, multiple users may play a ball game with a virtual ball and/or other virtual objects. One user may "catch" the virtual ball, and throw the ball back to another user. In another embodiment, a first user may be provided with a totem (e.g., a physical "bat" communicatively coupled to the AR system) to hit the virtual ball. In other embodiments, a virtual user interface may be presented to the AR user to allow the user to select one of many options. The user may use totems, haptic devices, wearable components, or simply touch the virtual screen to interact with the system.

Detecting a pose and an orientation of the user (e.g., the user's head and hand), and detecting a physical location of real objects in space may enable the AR system to display virtual content in an effective and enjoyable manner. However, such accurate detection of head and hand pose may be difficult to achieve. In other words, the AR system must recognize a physical location of a real object (e.g., user's head, totem, haptic device, wearable component, user's hand, etc.) and correlate the physical coordinates of the real object to virtual coordinates corresponding to one or more virtual objects being displayed to the user. This process can be improved by highly accurate sensors and sensor recognition systems that track a position and orientation of one or more objects at rapid rates. Current approaches do not perform localization at satisfactory speed or precision standards.

There, thus, is a need for a better localization system in the context of AR and VR devices.

SUMMARY

Embodiments of the present invention are directed to devices, systems and methods for facilitating virtual reality and/or augmented reality interaction for one or more users.

In one aspect, an augmented reality (AR) display system comprises an electromagnetic field emitter to emit a known magnetic field, an electromagnetic sensor to measure a parameter related to a magnetic flux measured at the electromagnetic sensor as a result of the emitted known magnetic field, wherein world coordinates of the electromagnetic sensor are known, a controller to determine pose information relative to the electromagnetic field emitter based at least in part on the measure parameter related to the magnetic flux measured at the electromagnetic sensor, and a display system to display virtual content to a user based at least in part on the determined pose information relative to the electromagnetic field emitter.

In one or more embodiments, the electromagnetic field emitter resides in a mobile component of the AR display system. In one or more embodiments, the mobile component is a hand-held component. In one or more embodiments, the mobile component is a totem.

In one or more embodiments, the mobile component is a head-mounted component of the AR display system. In one or more embodiments, the AR display system further comprises a head-mounted component that houses the display system, wherein the electromagnetic sensor is operatively coupled to the head-mounted component. In one or more embodiments, the world coordinates of the electromagnetic sensor is known based at least in part on SLAM analysis performed to determine head pose information, wherein the electromagnetic sensor is operatively coupled to a head-mounted component that houses the display system.

In one or more embodiments, the AR display further comprises one or more cameras operatively coupled to the head-mounted component, and wherein the SLAM analysis is performed based at least on data captured by the one or more cameras. In one or more embodiments, the electromagnetic sensors comprise one or more inertial measurement units (IMUs).

In one or more embodiments, the pose information corresponds to at least a position and orientation of the electromagnetic field emitter relative to the world. In one or more embodiments, the pose information is analyzed to determine world coordinates corresponding to the electromagnetic field emitter. In one or more embodiments, the controller detects an interaction with one or more virtual contents based at least in part on the pose information corresponding to the electromagnetic field emitter.

In one or more embodiments, the display system displays virtual content to the user based at least in part on the detected interaction. In one or more embodiments, the electromagnetic sensor comprises at least three coils to measure magnetic flux in three directions. In one or more embodiments, the at least three coils are housed together at substantially the same location, the electromagnetic sensor being coupled to a head-mounted component of the AR display system.

In one or more embodiments, the at least three coils are housed at different locations of the head-mounted component of the AR display system.

The AR display system of claim 1, further comprising a control and quick release module to decouple the magnetic field emitted by the electromagnetic field emitter. In one or more embodiments, the AR display system further comprises additional localization resources to determine the world coordinates of the electromagnetic field emitter. In one or more embodiments, the additional localization resources comprises a GPS receiver. In one or more embodiments, the additional localization resources comprises a beacon.

In one or more embodiments, the electromagnetic sensor comprises a non-solid ferrite cube. In one or more embodiments, the electromagnetic sensor comprises a stack of ferrite disks. In one or more embodiments, the electromagnetic sensor comprises a plurality of ferrite rods each having a polymer coating. In one or more embodiments, the electromagnetic sensor comprises a time division multiplexing switch.

In another aspect, a method to display augmented reality comprises emitting, through an electromagnetic field emitter, a known magnetic field, measuring, through an electromagnetic sensor, a parameter related to a magnetic flux measured at the electromagnetic sensor as a result of the emitted known magnetic field, wherein world coordinates of the electromagnetic sensor are known, determining pose information relative to the electromagnetic field emitter based at least in part on the measured parameter related to the magnetic flux measured at the electromagnetic sensor, and displaying virtual content to a user based at least in part on the determined pose information relative to the electromagnetic field emitter.

In one or more embodiments, the electromagnetic field emitter resides in a mobile component of the AR display system. In one or more embodiments, the mobile component is a hand-held component. In one or more embodiments, the mobile component is a totem. In one or more embodiments, the mobile component is a head-mounted component of the AR display system.

In one or more embodiments, the method further comprises housing the display system in a head-mounted component, wherein the electromagnetic sensor is operatively coupled to the head-mounted component. In one or more embodiments, the world coordinates of the electromagnetic sensor is known based at least in part on SLAM analysis performed to determine head pose information, wherein the electromagnetic sensor is operatively coupled to a head-mounted component that houses the display system.

In one or more embodiments, further comprises capturing image data through one or more cameras that are operatively coupled to the head-mounted component, and wherein the SLAM analysis is performed based at least on data captured by the one or more cameras. In one or more embodiments, the electromagnetic sensors comprise one or more inertial measurement units (IMUs).

In one or more embodiments, the pose information corresponds to at least a position and orientation of the electromagnetic field emitter relative to the world. In one or more embodiments, the pose information is analyzed to determine world coordinates corresponding to the electromagnetic field emitter. In one or more embodiments, the method further comprises detecting an interaction with one or more virtual contents based at least in part on the pose information corresponding to the electromagnetic field emitter.

In one or more embodiments, the method further comprises displaying virtual content to the user based at least in part on the detected interaction. In one or more embodiments, the electromagnetic sensor comprises at least three coils to measure magnetic flux in three directions. In one or more embodiments, the at least three coils are housed together at substantially the same location, the electromagnetic sensor being coupled to a head-mounted component of the AR display system. In one or more embodiments, the at least three coils are housed at different locations of the head-mounted component of the AR display system.

In one or more embodiments, the method further comprises decoupling the magnetic field emitted by the electromagnetic field emitter through a control and quick release module. In one or more embodiments, the method further comprises determining the world coordinates of the electromagnetic field emitter through additional localization resources. In one or more embodiments, the additional localization resources comprises a GPS receiver. In one or more embodiments, the additional localization resources comprises a beacon.

In yet another aspect, an augmented reality display system, comprises a handheld component housing an electromagnetic field emitter, the electromagnetic field emitter emitting a known magnetic field, a head mounted component having a display system that displays virtual content to a user, the head mounted component coupled to one or more electromagnetic sensors that detect the magnetic field emitted by the electromagnetic field emitter housed in the handheld component, wherein a head pose is known, and a controller communicatively coupled to the handheld component and the head mounted component, the controller receiving magnetic field data from the handheld component, and receiving sensor data from the head mounted component, wherein the controller determines a hand pose based at least in part on the received magnetic field data and the received sensor data, wherein the display system modifies the virtual content displayed to the user based at least in part on the determined hand pose.

In one or more embodiments, the handheld component is mobile. In one or more embodiments, the handheld component is a totem. In one or more embodiments, the handheld component is a gaming component. In one or more embodiments, the head pose is known based at least in part on SLAM analysis.

In one or more embodiments, the AR display system further comprises one or more cameras operatively coupled to the head-mounted component, and wherein the SLAM analysis is performed based at least on data captured by the one or more cameras. In one or more embodiments, the electromagnetic sensor comprises one or more inertial measurement units (IMUs).

In one or more embodiments, the head pose corresponds to at least a position and orientation of the electromagnetic sensor relative to the world. In one or more embodiments, the hand pose is analyzed to determine world coordinates corresponding to the handheld component. In one or more embodiments, the controller detects an interaction with one or more virtual contents based at least in part on the determined hand pose.

In one or more embodiments, the display system displays the virtual content to the user based at least in part on the detected interaction. In one or more embodiments, the electromagnetic sensor comprises at least three coils to measure magnetic flux in three directions. In one or more embodiments, the at least three coils are housed together at substantially the same location. In one or more embodiments, the at least three coils are housed at different locations of the head-mounted component.

In one or more embodiments, the AR display system further comprises a control and quick release module to decouple the magnetic field emitted by the electromagnetic field emitter. In one or more embodiments, the AR display system further comprises additional localization resources to determine the hand pose. In one or more embodiments, the additional localization resources comprises a GPS receiver. In one or more embodiments, the additional localization resources comprises a beacon.

Additional and other objects, features, and advantages of the invention are described in the detail description, figures and claims.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 2A-2D illustrate various embodiments of wearable AR devices

FIGS. 9A-9F illustrate various embodiments of the control and quick release module.

FIGS. 12A-12E illustrate various embodiments of a ferrite cube to be coupled to the electromagnetic sensors.

DETAILED DESCRIPTION

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
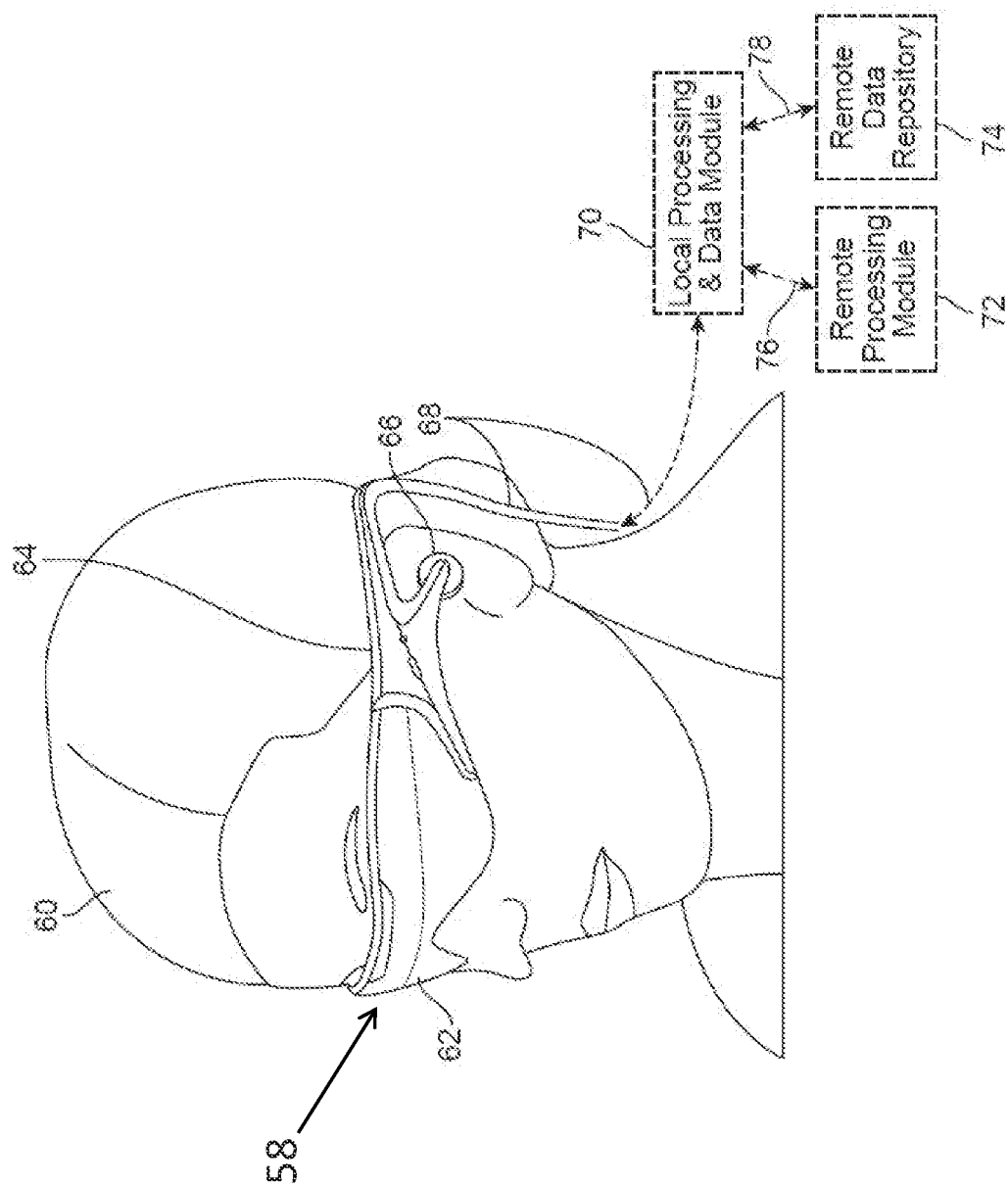
Figure 2C:
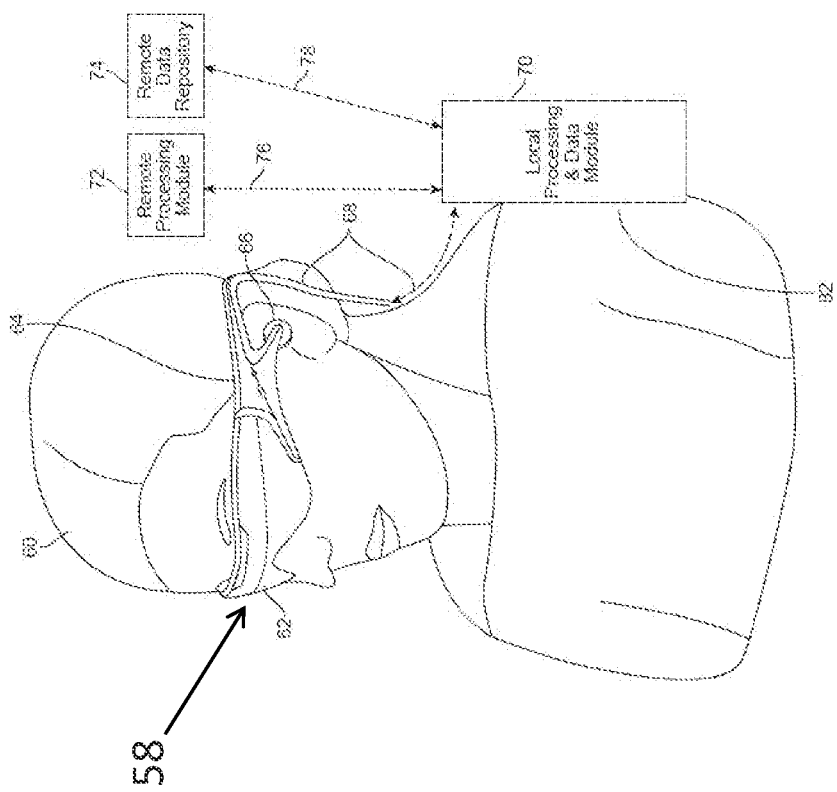
Figure 2D:
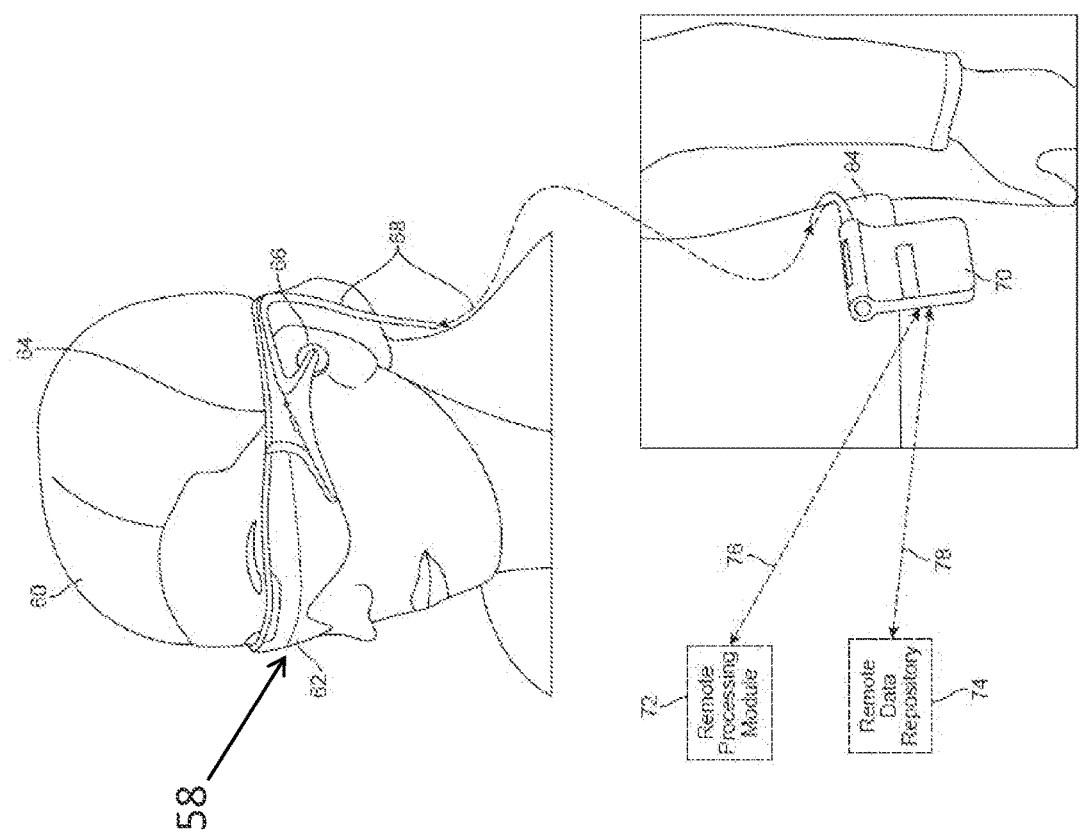

As shown in FIG. 2A, an AR system user 60 is depicted wearing a head mounted component 58 featuring a frame 64 structure coupled to a display system 62 positioned in front of the eyes of the user. A speaker 66 is coupled to the frame 64 in the depicted configuration and positioned adjacent the ear canal of the user (in one embodiment, another speaker, not shown, is positioned adjacent the other ear canal of the user to provide for stereo/shapeable sound control). The display 62 may be operatively coupled 68, such as by a wired lead or wireless connectivity, to a local processing and data module 70 which may be mounted in a variety of configurations, such as fixedly attached to the frame 64, fixedly attached to a helmet or hat 80 as shown in the embodiment of FIG. 2B, embedded in headphones, removably attached to the torso 82 of the user 60 in a backpack-style configuration as shown in the embodiment of FIG. 2C, or removably attached to the hip 84 of the user 60 in a belt-coupling style configuration as shown in the embodiment of FIG. 2D.

The local processing and data module 70 may comprise a power-efficient processor or controller, as well as digital memory, such as flash memory, both of which may be utilized to assist in the processing, caching, and storage of data, which may be (a) captured from sensors which may be operatively coupled to the frame 64, such as image capture devices (such as cameras), microphones, inertial measurement units, accelerometers, compasses, GPS units, radio devices, and/or gyros; and/or (b) acquired and/or processed using the remote processing module 72 and/or remote data repository 74, possibly for passage to the display 62 after such processing or retrieval. The local processing and data module 70 may be operatively coupled (76, 78), such as via a wired or wireless communication links, to the remote processing module 72 and remote data repository 74 such that these remote modules (72, 74) are operatively coupled to each other and available as resources to the local processing and data module 70.

In one embodiment, the remote processing module 72 may comprise one or more relatively powerful processors or controllers configured to analyze and process data and/or image information. In one embodiment, the remote data repository 74 may comprise a relatively large-scale digital data storage facility, which may be available through the internet or other networking configuration in a "cloud" resource configuration. In one embodiment, all data may be stored and all computation may be performed in the local processing and data module, allowing fully autonomous use from any remote modules.

Figure 3:
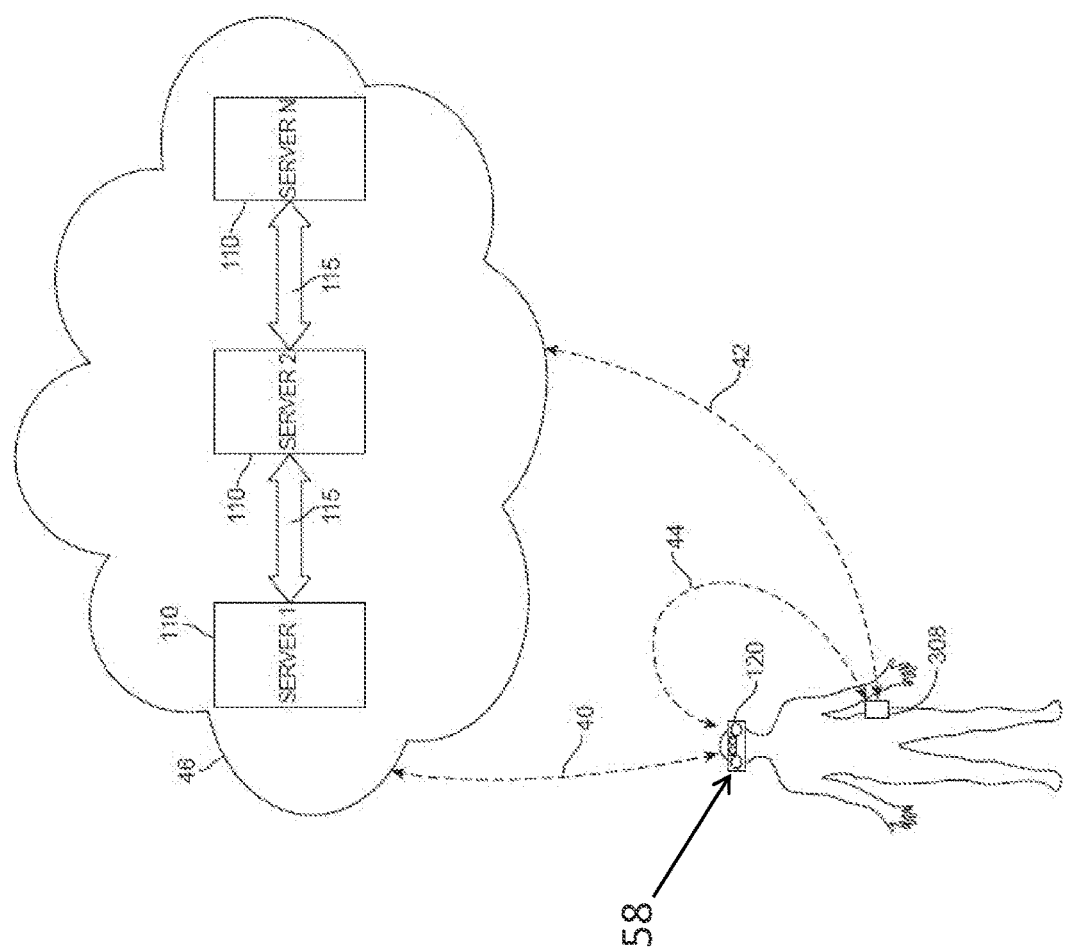
FIG. 3 illustrates an example embodiment of a user of a wearable AR device interacting with one or more cloud servers of the AR system.

Referring now to FIG. 3, a schematic illustrates coordination between the cloud computing assets 46 and local processing assets, which may, for example reside in head mounted componentry 58 coupled to the user's head 120 and a local processing and data module 70, coupled to the user's belt 308; therefore the component 70 may also be termed a "belt pack" 70, as shown in FIG. 3. In one embodiment, the cloud 46 assets, such as one or more cloud server systems 110 are operatively coupled 115, such as via wired or wireless networking (wireless being preferred for mobility, wired being preferred for certain high-bandwidth or high-data-volume transfers that may be desired), directly to (40, 42) one or both of the local computing assets, such as processor and memory configurations, coupled to the user's head 120 and belt 308 as described above. These computing assets local to the user may be operatively coupled to each other as well, via wired and/or wireless connectivity configurations 44, such as the wired coupling 68 discussed below in reference to FIG. 8. In one embodiment, to maintain a low-inertia and small-size subsystem mounted to the user's head 120, primary transfer between the user and the cloud 46 may be via the link between the subsystem mounted at the belt 308 and the cloud, with the head mounted subsystem 120 primarily data-tethered to the belt-based subsystem 308 using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system 62 shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources. The map (also referred to as a "passable world model") may be a large database comprising raster imagery, 3-D and 2-D points, parametric information and other information about the real world. As more and more AR users continually capture information about their real environment (e.g., through cameras, sensors, IMUs, etc.), the map becomes more and more accurate and complete.

Figure 1:
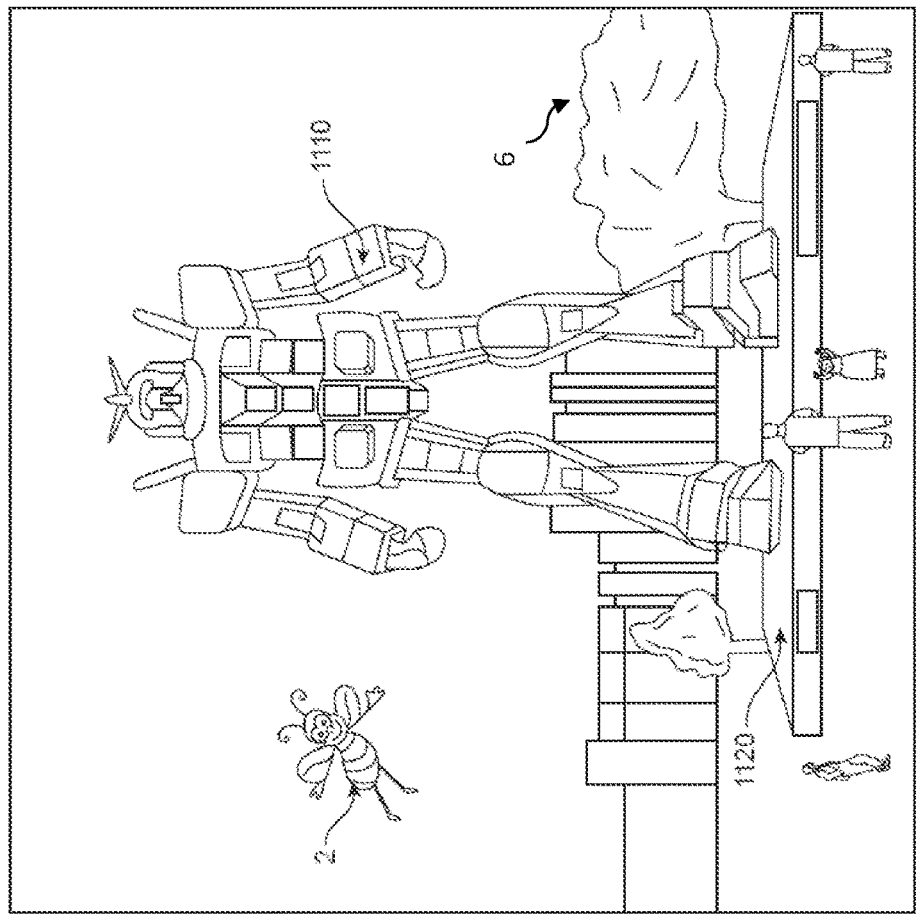
FIG. 1 illustrates a plan view of an AR scene displayed to a user of an AR system according to one embodiment.

With a configuration as described above, wherein there is one "model" of the world that can reside on cloud computing resources and be distributed from the cloud server, such a world can be "passable" to one or more users in a relatively low bandwidth form. This may be preferable to transferring real-time video data or similar complex information from one AR system to another. The augmented experience of the person standing near the statue (i.e., as shown in FIG. 1) may be informed by the cloud-based world model, a subset of which may be passed down to the person's local display device to complete the view. A person sitting at a remote display device (e.g., a personal computer sitting on a desk), can efficiently download that same section of information from the cloud and have it rendered on the personal computer display. In yet another embodiment, yet another user may be present in real-time at the park, and may take a walk in that park, with a friend (e.g., the person at the personal computer) joining the user through a shared AR and/or VR experience. In order to render the park scene to the friend, the AR system may detect a location of the street, a location of the trees in the park, a location of the statue, etc. This location may be uploaded to the passable world model in the cloud, and the friend (at the personal computer) can download the portion of the passable world from the cloud, and then start "walking along" with the AR user in the park. Of course, in some embodiments, the friend may be rendered as an avatar in the passable world model to the AR user in the park such that the AR user can walk alongside the virtual friend in the park.

More particularly, in order to capture details of the world such that it can be passed on to the cloud (and subsequently to other AR users) 3-D points pertaining to various objects may be captured from the environment, and the pose (i.e., vector and/or origin position information relative to the world) of the cameras that capture those images or points may be determined. These 3-D points may be "tagged", or associated, with this pose information. It should be appreciated that there may be a large number of AR systems capturing the same points in any given environment. For example, points captured by a second camera (of a second AR system) may be utilized to determine the head pose of the second camera. In other words, one can orient and/or localize a second camera based upon comparisons with tagged images from a first camera. Then, this information may be utilized to extract textures, make maps, and create one or more virtual copies of the real world.

In one or more embodiments, the AR system can be utilized to capture both 3-D points and the 2-D images that produced the points. As discussed above, these points and images may be sent out to the cloud storage and processing resource (e.g., the servers 110 of FIG. 3), in some embodiments. In other embodiments, this information may be cached locally with embedded pose information (i.e., the tagged images) such that tagged 2-D images are sent to the cloud along with 3-D points. If a user is observing a dynamic scene, the user may also send additional information up to the cloud servers. In one or more embodiments, object recognizers may run (either on the cloud resource or on the local system) in order to recognize one or more objects in the captured points. More information on object recognizers and the passable world model may be found in U.S. patent application Ser. No. 14/205,126, entitled "SYSTEM AND METHOD FOR AUGMENTED AND VIRTUAL REALITY", which is incorporated by reference in its entirety herein, along with the following additional disclosures, which related to augmented and virtual reality systems such as those developed by Magic Leap, Inc. of Fort Lauderdale, Fla.: U.S. patent application Ser. No. 14/641,376; U.S. patent application Ser. No. 14/555,585; U.S. patent application Ser. No. 14/212,961; U.S. patent application Ser. No. 14/690,401; U.S. patent application Ser. No. 13/663,466; and U.S. patent application Ser. No. 13/684,489.

In order to capture points that can be used to create the "passable world model," it is helpful to accurately know the user's location, pose and orientation with respect to the world. More particularly, the user's position must be localized to a granular degree, because it may be important to know the user's head pose, as well as hand pose (if the user is clutching a handheld component, gesturing, etc.). In one or more embodiments, GPS and other localization information may be utilized as inputs to such processing. Highly accurate localization of the user's head, totems, hand gestures, haptic devices etc. are desirable in processing images and points derived from a particular AR system, and also in order to displaying appropriate virtual content to the user.

One approach to achieve high precision localization may involve the use of an electromagnetic field coupled with electromagnetic sensors that are strategically placed on the user's AR head set, belt pack, and/or other ancillary devices (e.g., totems, haptic devices, gaming instruments, etc.). Electromagnetic tracking systems typically comprise at least an electromagnetic field emitter and at least one electromagnetic field sensor. The electromagnetic sensors may measure electromagnetic fields with a known distribution. Based on these measurements a position and orientation of a field sensor relative to the emitter is determined.

Figure 4:
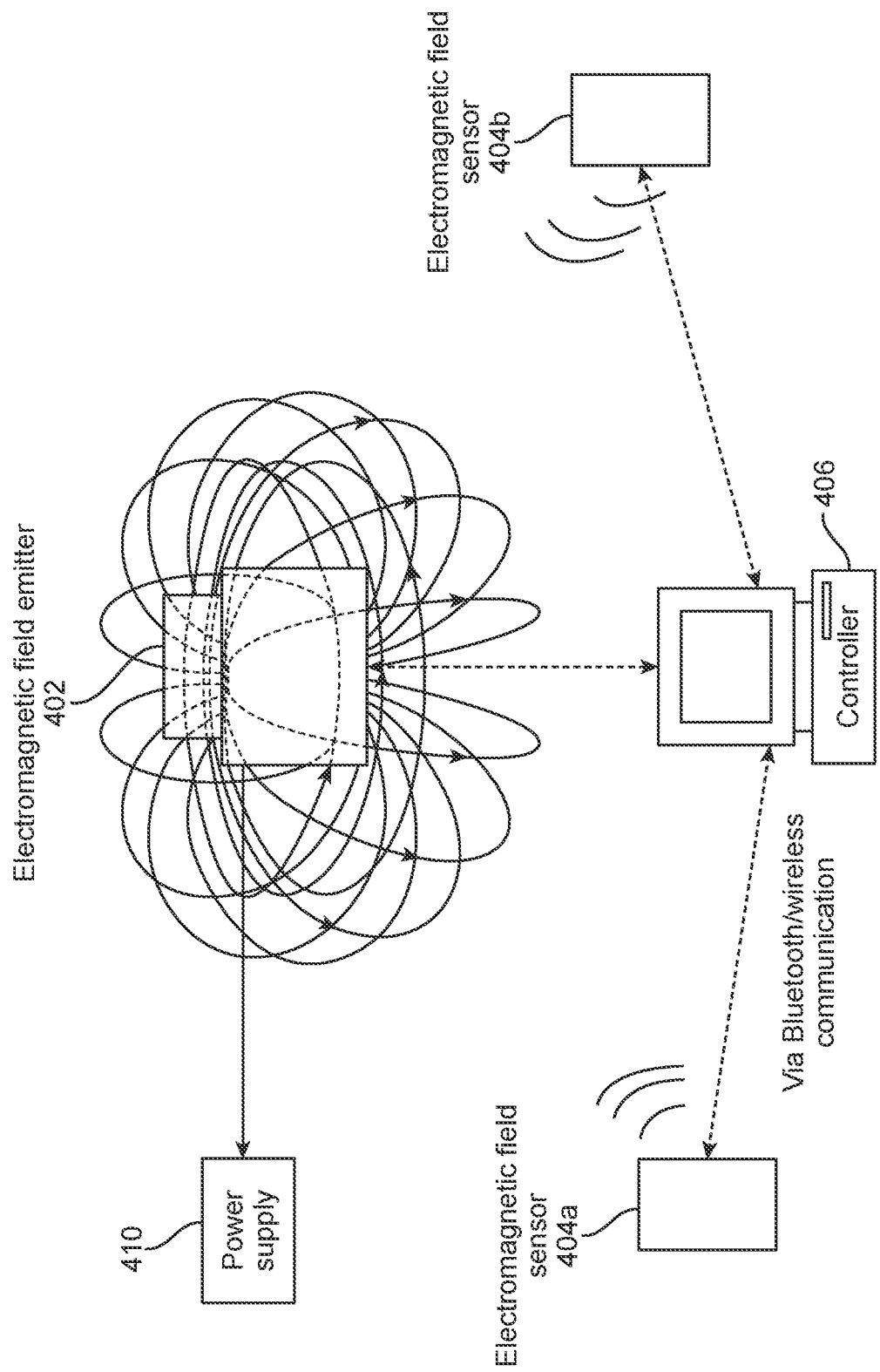
FIG. 4 illustrates an example embodiment of an electromagnetic tracking system.

Referring now to FIG. 4, an example system of an electromagnetic tracking system (e.g., such as those developed by organizations such as the Biosense® division of Johnson & Johnson Corporation, Polhemus®, Inc. of Colchester, Vt., and manufactured by Sixense® Entertainment, Inc. of Los Gatos, Calif., and other tracking companies) is illustrated. In one or more embodiments, the electromagnetic tracking system comprises an electromagnetic field emitter 402 which is configured to emit a known magnetic field. As shown in FIG. 4, the electromagnetic field emitter 402 may be coupled to a power supply 410 (e.g., electric current, batteries, etc.) to provide power to the electromagnetic field emitter 402.

In one or more embodiments, the electromagnetic field emitter 402 comprises several coils (e.g., at least three coils positioned perpendicular to each other to produce a field in the x, y and z directions) that generate magnetic fields. These magnetic fields are used to establish a coordinate space. This may allow the system to map a position of the sensors 404 in relation to the known magnetic field, which, in turn, helps determine a position and/or orientation of the sensors 404. In one or more embodiments, the electromagnetic sensors 404a, 404b, etc. may be attached to one or more real objects. The electromagnetic sensors 404 may comprise smaller coils in which current may be induced through the emitted electromagnetic field. Generally, the "sensor" components

404 may comprise small coils or loops, such as a set of three differently-oriented (i.e., such as orthogonally oriented relative to each other) coils coupled together within a small structure such as a cube or other container, that are positioned/oriented to capture incoming magnetic flux from the magnetic field emitted by the electromagnetic emitter 402. By comparing currents induced through these coils, and by knowing the relative position and orientation of the coils relative to each other, a relative position and orientation of a sensor 404 relative to the electromagnetic emitter 402 may be calculated.

One or more parameters pertaining to a behavior of the coils in the electromagnetic tracking sensors 404 and the inertial measurement unit ("IMU") components operatively coupled to the electromagnetic tracking sensors 404 may be measured in order to detect a position and/or orientation of the sensor 404 (and the object to which it is attached to) relative to a coordinate system to which the electromagnetic field emitter 402 is coupled. Of course this coordinate system may be translated into a world coordinate system, in order to determine a location or pose of the electromagnetic field emitter in the real world. In one or more embodiments, multiple sensors 404 may be used in relation to the electromagnetic emitter 402 to detect a position and orientation of each of the sensors 404 within the coordinate space associated with the electromagnetic field emitter 402.

It should be appreciated that in some embodiments, head pose may already be known based on sensors on the head-mounted component of the AR system, and SLAM analysis performed based on sensor data and image data captured through the headmounted AR system. However, it may be important to know a position of the user's hand (e.g., a handheld component like a totem, etc.) relative to the known head pose. In other words, it may be important to know a hand pose relative to the head pose. Once the relationship between the head (assuming the sensors are placed on the headmounted component) and hand is known, a location of the hand relative to the world (e.g., world coordinates) can be easily calculated.

In one or more embodiments, the electromagnetic tracking system may provide 3-D positions (i.e., X, Y and Z directions) of the sensors 404, and may further provide location information of the sensors 404 in two or three orientation angles. In one or more embodiments, measurements of the IMUs may be compared to the measurements of the coil to determine a position and orientation of the sensors 404. In one or more embodiments, both electromagnetic (EM) data and IMU data, along with various other sources of data, such as cameras, depth sensors, and other sensors, may be combined to determine the position and orientation of the electromagnetic sensors 404.

In one or more embodiments, this information may be transmitted (e.g., wireless communication, Bluetooth, etc.) to a controller 406. In one or more embodiments, pose information (e.g., position and orientation) corresponding to the sensors 404 may be reported at a relatively high refresh rate to the controller 406. Conventionally, an electromagnetic emitter 402 may be coupled to a relatively stable and large object, such as a table, operating table, wall, or ceiling, etc. and one or more sensors 404 may be coupled to smaller objects, such as medical devices, handheld gaming components, totems, frame of the head-mounted AR system, or the like.

Figure 6:
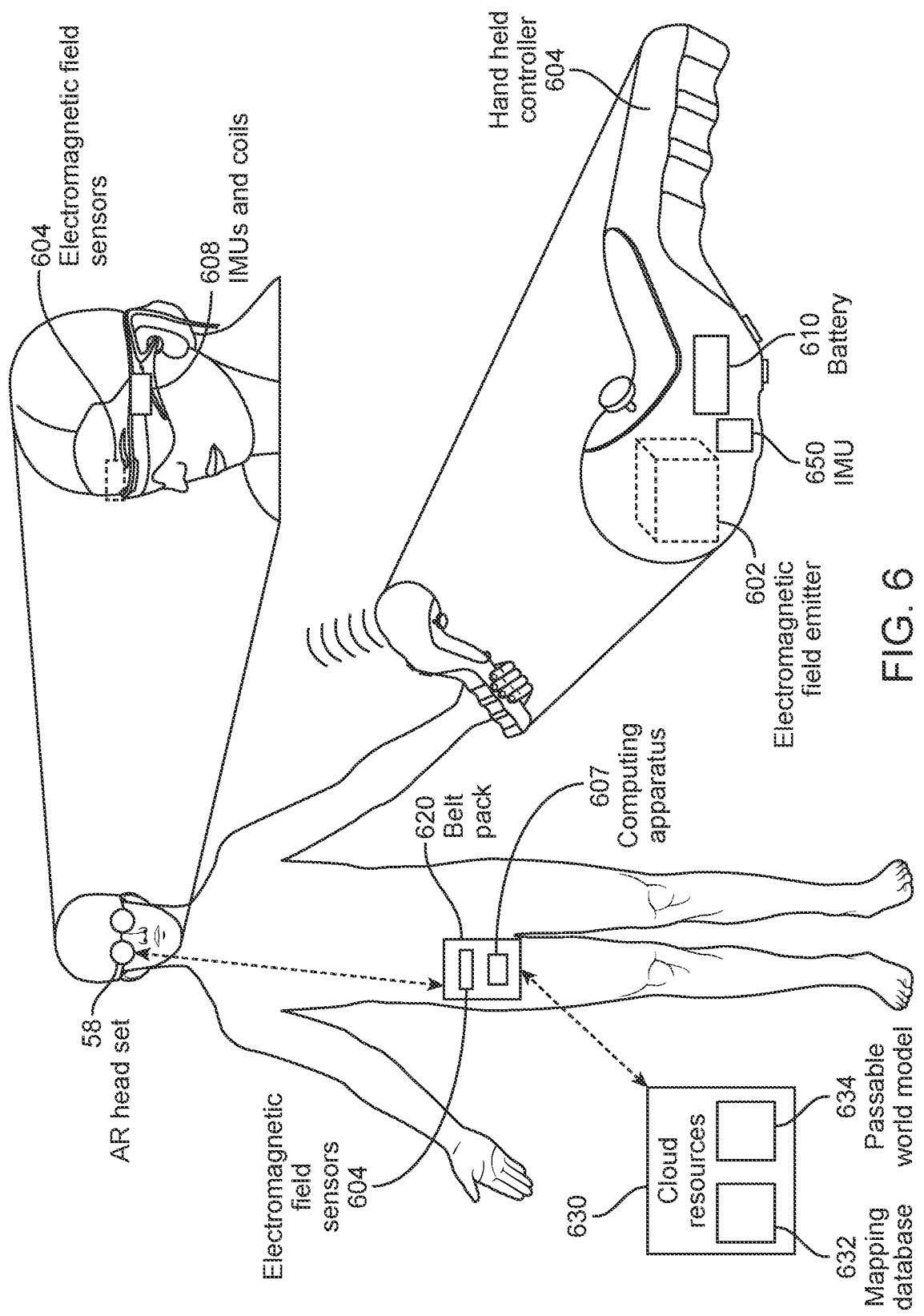
FIG. 6 illustrates an example diagram of utilizing an electromagnetic tracking system to determine head pose.

Alternatively, as described below in reference to FIG. 6, various features of the electromagnetic tracking system may be employed to produce a configuration wherein changes or deltas in position and/or orientation between two objects that move in space relative to a more stable global coordinate system may be tracked. In other words, a configuration is shown in FIG. 6 wherein a variation of an electromagnetic tracking system may be utilized to track position and orientation changes between a head-mounted component and a hand-held component, while head pose relative to the global coordinate system (say of the room environment local to the user) is determined otherwise, such as by simultaneous localization and mapping ("SLAM") techniques using outward-capturing cameras which may be coupled to the head mounted component of the AR system.

Referring back to FIG. 4, the controller 406 may control the electromagnetic field emitter 402, and may also capture measurement data from the various electromagnetic sensors 404. It should be appreciated that the various components of the system may be coupled to each other through any electro-mechanical or wireless/Bluetooth means. The controller 406 may also store data regarding the known magnetic field, and the coordinate space in relation to the magnetic field. This information may then be used to detect the position and orientation of the sensors 404 in relation to the coordinate space corresponding to the known electromagnetic field, which can then be used to determined world coordinates of the user's hand (e.g., location of the electromagnetic emitter).

One advantage of electromagnetic tracking systems is that they can produce highly accurate tracking results with minimal latency and high resolution. Additionally, the electromagnetic tracking system does not necessarily rely on optical trackers, thereby making it easier to track sensors/objects that are not in the user's line-of-vision.

It should be appreciated that the strength of the electromagnetic field ("v") drops as a cubic function of distance ("r") from a coil transmitter (e.g., electromagnetic field emitter 402). One or more algorithms may be formulated based on a distance of the sensors from the electromagnetic field emitter. The controller 406 may be configured with such algorithms to determine a position and orientation of the sensor/object at varying distances away from the electromagnetic field emitter. Given the rapid decline of the strength of the electromagnetic field as one moves farther away from the electromagnetic emitter, improved results, in terms of accuracy, efficiency and low latency, may be achieved at closer distances. In typical electromagnetic tracking systems, the electromagnetic field emitter is powered by electric current (e.g., plug-in power supply) and has sensors located within a 20 ft. radius away from the electromagnetic field emitter. A shorter radius between the sensors and field emitter may be more desirable in many applications, including AR applications.

Figure 5:
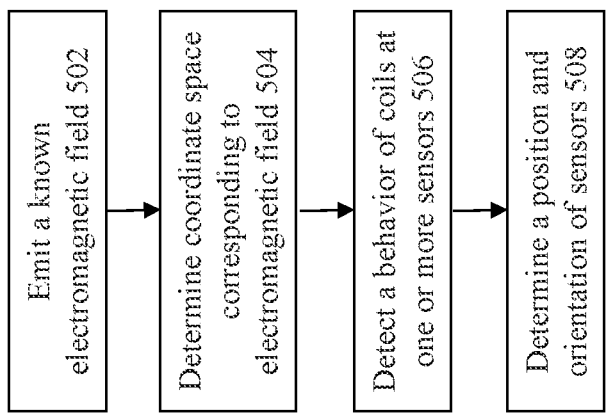
FIG. 5 illustrates an example method of determining a position and orientation of sensors, according to one example embodiment.

Referring now to FIG. 5, an example flowchart describing a functioning of a typical electromagnetic tracking system is briefly described. At 502, a known electromagnetic field is emitted. In one or more embodiments, the electromagnetic field emitter may generate a magnetic field. In other words, each coil of the emitter may generate an electric field in one direction (e.g., x, y or z). The magnetic fields may be generated with an arbitrary waveform. In one or more embodiments, each of the axes may oscillate at a slightly different frequency.

At 504, a coordinate space corresponding to the electromagnetic field may be determined. For example, the controller 406 of FIG. 4 may automatically determine a coordinate space around the electromagnetic emitter based on parameters of the electromagnetic field. At 506, a behavior of the coils at the sensors (which may be attached to a known object) may be detected/measured. For example, a current induced at the coils may be measured. In other embodiments, a rotation of a coil, or other quantifiable behavior may be tracked and measured. At 508, this measurement may be used to determine/calculate a position and orientation of the sensor(s) and/or known object. For example, the controller may consult a mapping table that correlates a behavior of the coils at the sensors to various positions or orientations. Based on these calculations, the position and orientation of the sensors (or object attached thereto) within the coordinate space may be determined. In some embodiments, the pose/location information may be determined at the sensors. In other embodiment, the sensors communicate data detected at the sensors to the controller, and the controller may consult the mapping table to determined pose information relative to the known magnetic field (e.g., coordinates relative to the handheld component).

In the context of AR systems, one or more components of the electromagnetic tracking system may need to be modified in order to facilitate accurate tracking of mobile components. As described above, tracking the user's head pose and orientation is helpful in many AR applications. Accurate determination of the user's head pose and orientation allows the AR system to display the right virtual content to the user in the appropriate position in the AR display. For example, the virtual scene may comprise a monster hiding behind a real building. Depending on the pose and orientation of the user's head in relation to the building, the view of the virtual monster may need to be modified such that a realistic AR experience is provided.

In other embodiments, a position and/or orientation of a totem, haptic device or some other means of interacting with a virtual content may be important in enabling the AR user to interact with the AR system. For example, in many gaming applications, the AR system must detect a position and orientation of a real object in relation to virtual content. Or, when displaying a virtual interface, a position of a totem, user's hand, haptic device or any other real object configured for interaction with the AR system must be known in relation to the displayed virtual interface in order for the system to understand a command, etc. Conventional localization methods including optical tracking and other methods are typically plagued with high latency and low resolution problems, which makes rendering virtual content challenging in many AR applications.

In one or more embodiments, the electromagnetic tracking system, discussed above may be adapted to the AR system to detect position and orientation of one or more objects in relation to an emitted electromagnetic field. Typical electromagnetic systems tend to have large and bulky electromagnetic emitters (e.g., 402 in FIG. 4), which may make them less-than-ideal for use in AR applications. However, smaller electromagnetic emitters (e.g., in the millimeter range) may be used to emit a known electromagnetic field in the context of the AR system.

Referring now to FIG. 6, an electromagnetic tracking system may be incorporated into an AR system as shown, with an electromagnetic field emitter 602 incorporated as part of a hand-held controller 606. In one or more embodiments, the hand-held controller may be a totem to be used in a gaming application. In other embodiments, the hand-held controller may be a haptic device that may be used to interact with the AR system (e.g., via a virtual user interface). In yet other embodiments, the electromagnetic field emitter may simply be incorporated as part of the belt pack 70, as shown in FIG. 2D. The hand-held controller 606 may comprise a battery 610 or other power supply that powers the electromagnetic field emitter 602.

It should be appreciated that the electromagnetic field emitter 602 may also comprise or be coupled to an IMU component 650 that is configured to assist in determining position and/or orientation of the electromagnetic field emitter 602 relative to other components. This may be useful in cases where both the electromagnetic field emitter 602 and the sensors 604 (discussed in further detail below) are mobile. In some embodiments, placing the electromagnetic field emitter 602 in the hand-held controller rather than the belt pack, as shown in the embodiment of FIG. 6, ensures that the electromagnetic field emitter does not compete for resources at the belt pack, but rather uses its own battery source at the hand-held controller 606.

In one or more embodiments, electromagnetic sensors 604 may be placed on one or more locations on the user's headset 58, along with other sensing devices such as one or more IMUs or additional magnetic flux capturing coils 608. For example, as shown in FIG. 6, sensors 604, 608 may be placed on either side of the head set 58. Since these sensors 604, 608 are engineered to be rather small (and hence may be less sensitive, in some cases), it may be important to include multiple sensors in order to improve efficiency and precision of the measurements.

In one or more embodiments, one or more sensors 604, 608 may also be placed on the belt pack 620 or any other part of the user's body. The sensors 604, 608 may communicate wirelessly or through Bluetooth® with a computing apparatus 607 (e.g., the controller) that determines a pose and orientation of the sensors 604, 608 (and the AR headset 58 to which they are attached) in relation to the known magnetic field emitted by the electromagnetic field emitter 602. In one or more embodiments, as shown in FIG. 6, the computing apparatus 607 may reside at the belt pack 620. In other embodiments, the computing apparatus 607 may reside at the headset 58 itself, or even the hand-held controller 604. In one or more embodiments, the computing apparatus 607 may receive the measurements of the sensors 604, 608, and determine a position and orientation of the sensors 604, 608 in relation to the known electromagnetic field emitted by the electromagnetic filed emitter 602.

In one or more embodiments, a mapping database 632 may be consulted to determine the location coordinates of the sensors 604, 608. The mapping database 632 may reside in the belt pack 620 in some embodiments. In the illustrated embodiment, the mapping database 632 resides on a cloud resource 630. As shown in FIG. 6, the computing apparatus 607 communicates wirelessly to the cloud resource 630. The determined pose information in conjunction with points and images collected by the AR system may then be communicated to the cloud resource 630, and then be added to the passable world model 634.

As described above, conventional electromagnetic emitters may be too bulky for use in AR devices. Therefore, the electromagnetic field emitter may be engineered to be compact, using smaller coils compared to traditional systems. However, given that the strength of the electromagnetic field decreases as a cubic function of the distance away from the field emitter, a shorter radius between the electromagnetic sensors 604 and the electromagnetic field emitter 602 (e.g., about 3-3.5 ft.) may reduce power consumption while maintaining acceptable field strength when compared to conventional systems such as the one detailed in FIG. 4.

In one or more embodiments, this feature may be utilized to prolong the life of the battery 610 that powers the controller 606 and the electromagnetic field emitter 602. Alternatively, this feature may be utilized to reduce the size of the coils generating the magnetic field at the electromagnetic field emitter 602. However, in order to get the same strength of magnetic field, the power of the electromagnetic field emitter 602 may be need to be increased. This allows for an electromagnetic field emitter unit 602 that may fit compactly at the hand-held controller 606.

Several other changes may be made when using the electromagnetic tracking system for AR devices. In one or more embodiments, IMU-based pose tracking may be used. In such embodiments, maintaining the IMUs as stable as possible increases an efficiency of the pose detection process. The IMUs may be engineered such that they remain stable up to 50-100 milliseconds, which results in stable signals with pose update/reporting rates of 10-20 Hz. It should be appreciated that some embodiments may utilize an outside pose estimator module (because IMUs may drift over time) that may enable pose updates to be reported at a rate of 10-20 Hz. By keeping the IMUs stable for a reasonable amount of time, the rate of pose updates may be dramatically decreased to 10-20 Hz (as compared to higher frequencies in conventional systems).

Yet another way to conserve power of the AR system may be to run the electromagnetic tracking system at a 10% duty cycle (e.g., only pinging for ground every 100 milliseconds). In other words, the electromagnetic tracking system operates for 10 milliseconds out of every 100 milliseconds to generate a pose estimate. This directly translates to power savings, which may, in turn, affect size, battery life and cost of the AR device.

In one or more embodiments, this reduction in duty cycle may be strategically utilized by providing two hand-held controllers (not shown) rather than just one. For example, the user may be playing a game that requires two totems, etc. Or, in a multi-user game, two users may have their own totems/hand-held controllers to play the game. When two controllers (e.g., symmetrical controllers for each hand) are used rather than one, the controllers may operate at offset duty cycles. The same concept may also be applied to controllers utilized by two different users playing a multi-player game, for example.

Figure 7:
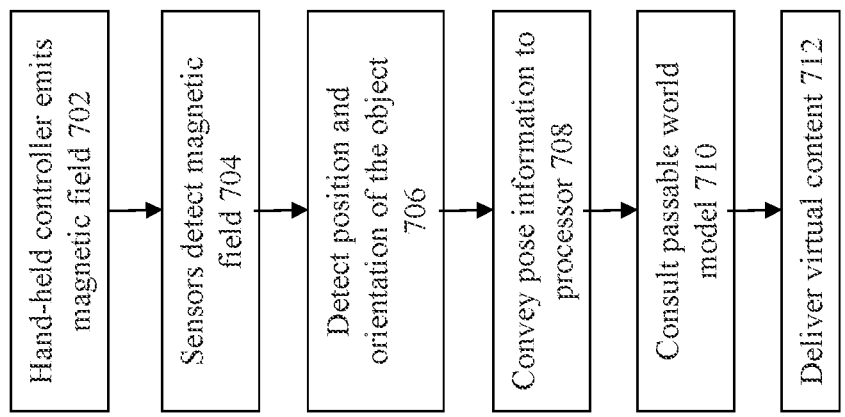
FIG. 7 illustrates an example method of delivering virtual content to a user based on detected head pose.

Referring now to FIG. 7, an example flow chart describing the electromagnetic tracking system in the context of AR devices is described. At 702, the hand-held controller 606 emits a magnetic field. At 704, the electromagnetic sensors 604 (placed on headset 58, belt pack 620, etc.) detect the magnetic field. At 706, a position and orientation of the headset/belt is determined based on a behavior of the coils/IMUs 608 at the sensors 604. In some embodiments, the detected behavior of the sensors 604 is communicated to the computing apparatus 607, which in turn determines the position and orientation of the sensors 604 in relation to the electromagnetic field (e.g., coordinates relative to the hand-held component). Of course, it should be appreciated that these coordinates may then be converted to world coordinates, since the head pose relative to the world may be known through SLAM processing, as discussed above.

At 708, the pose information is conveyed to the computing apparatus 607 (e.g., at the belt pack 620 or headset 58). At 710, optionally, the passable world model 634 may be consulted determine virtual content to be displayed to the user based on the determined head pose and hand pose. At 712, virtual content may be delivered to the user at the AR headset 58 based on the correlation. It should be appreciated that the flowchart described above is for illustrative purposes only, and should not be read as limiting.

Advantageously, using an electromagnetic tracking system similar to the one outlined in FIG. 6 enables pose tracking at a higher refresh rate and lower latency (e.g., head position and orientation, position and orientation of totems, and other controllers). This allows the AR system to project virtual content with a higher degree of accuracy, and with lower latency when compared to optical tracking techniques for calculating pose information.

Figure 8:
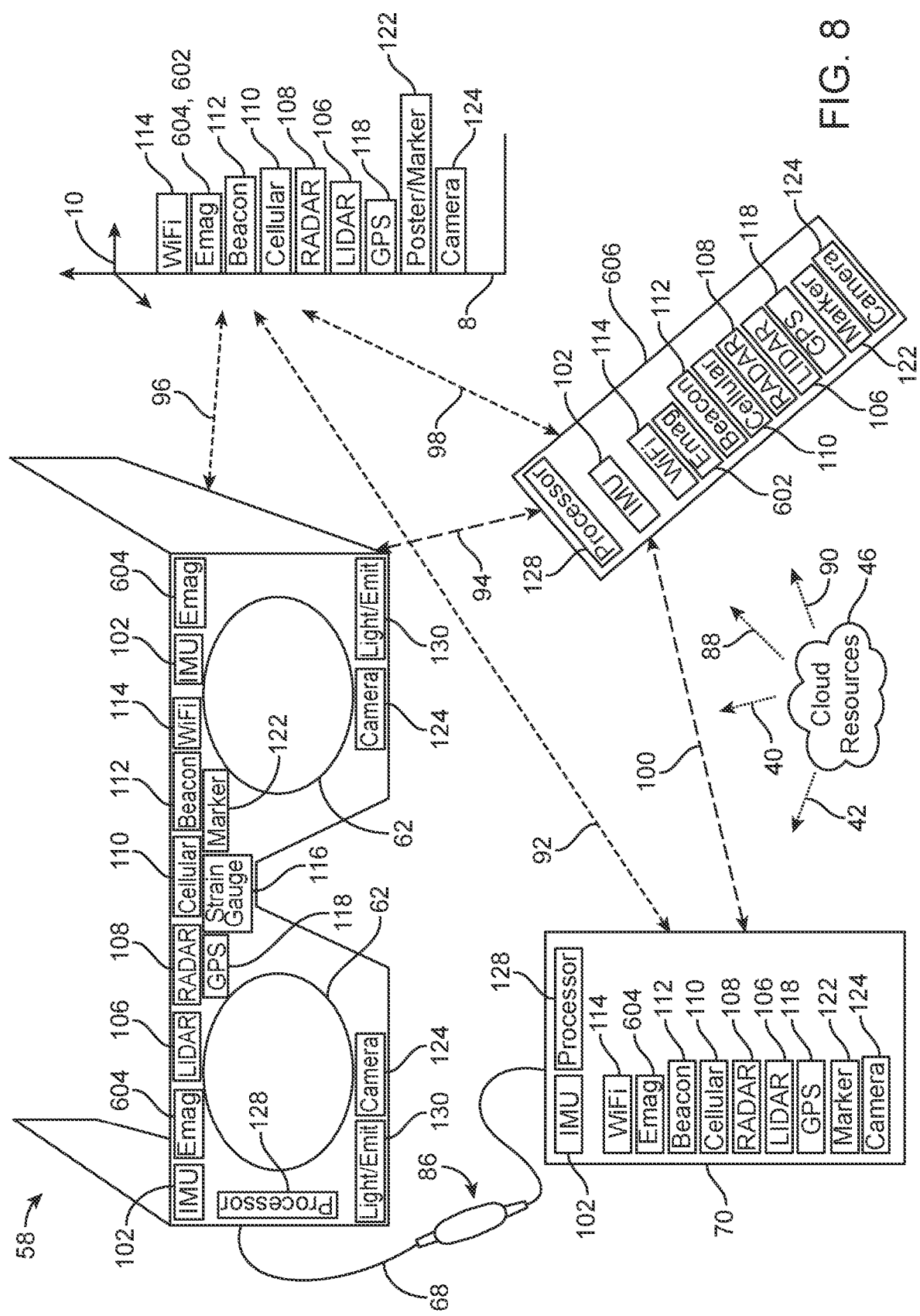
FIG. 8 illustrates a schematic view of various components of an AR system according to one embodiment having an electromagnetic transmitter and electromagnetic sensors.

Referring to FIG. 8, a system configuration is illustrated featuring many sensing components, similar to the sensors described above. It should be appreciated that the reference numbers of FIGS. 2A-2D, and FIG. 6 are repeated in FIG. 8. A head mounted wearable component 58 is shown operatively coupled 68 to a local processing and data module 70, such as a belt pack (similar to FIG. 2D), here using a physical multicore lead which also features a control and quick release module 86 as described below in reference to FIGS. 9A-9F. The local processing and data module 70 may be operatively coupled 100 to a hand held component 606 (similar to FIG. 6). In one or more embodiments, the local processing module 70 may be coupled to the hand-held component 606 through a wireless connection such as low power Bluetooth®. In one or more embodiments, the hand held component 606 may also be operatively coupled 94 directly to the head mounted wearable component 58, such as by a wireless connection such as low power Bluetooth®.

Generally, where IMU data is passed in order to detect pose information of various components, a high-frequency connection may be desirable, such as in the range of hundreds or thousands of cycles/second or higher. On the other hand, tens of cycles per second may be adequate for electromagnetic localization sensing, such as by the sensor 604 and transmitter 602 pairings. Also shown is a global coordinate system 10, representative of fixed objects in the real world around the user, such as a wall 8. Cloud resources 46 also may be operatively coupled 42, 40, 88, 90 to the local processing and data module 70, to the head mounted wearable component 58, to resources which may be coupled to the wall 8 or other item fixed relative to the global coordinate system 10, respectively. The resources coupled to the wall 8 or having known positions and/or orientations relative to the global coordinate system 10 may include a Wi-Fi transceiver 114, an electromagnetic emitter 602 and/or receiver 604, a beacon or reflector 112 configured to emit or reflect a given type of radiation, such as an infrared LED beacon, a cellular network transceiver 110, a RADAR emitter or detector 108, a LIDAR emitter or detector 106, a GPS transceiver 118, a poster or marker having a known detectable pattern 122, and a camera 124.

The head mounted wearable component 58 features similar components, as illustrated, in addition to lighting emitters 130 configured to assist the camera 124 detectors, such as infrared emitters 130 for an infrared camera 124. In one or more embodiments, the head mounted wearable component 58 may further comprise one or more strain gauges 116, which may be fixedly coupled to the frame or mechanical platform of the head mounted wearable component 58 and configured to determine deflection of such platform in between components such as electromagnetic receiver sensors 604 or display elements 62, wherein it may be valuable to understand if bending of the platform has occurred, such as at a thinned portion of the platform, such as the portion above the nose on the eyeglasses-like platform depicted in FIG. 8.

The head mounted wearable component 58 may also include a processor 128 and one or more IMUs 102. Each of the components preferably are operatively coupled to the processor 128. The hand held component 606 and local processing and data module 70 are illustrated featuring similar components. As shown in FIG. 8, with so many sensing and connectivity means, such a system is likely to be heavy, large, relatively expensive, and likely to consume large amounts of power. However, for illustrative purposes, such a system may be utilized to provide a very high level of connectivity, system component integration, and position/orientation tracking. For example, with such a configuration, the various main mobile components (58, 70, 606) may be localized in terms of position relative to the global coordinate system using Wi-Fi, GPS, or Cellular signal triangulation; beacons, electromagnetic tracking (as described above), RADAR, and LIDIR systems may provide yet further location and/or orientation information and feedback. Markers and cameras also may be utilized to provide further information regarding relative and absolute position and orientation. For example, the various camera components 124, such as those shown coupled to the head mounted wearable component 58, may be utilized to capture data which may be utilized in simultaneous localization and mapping protocols, or "SLAM", to determine where the component 58 is and how it is oriented relative to other components.

Figures 9D, 9E:
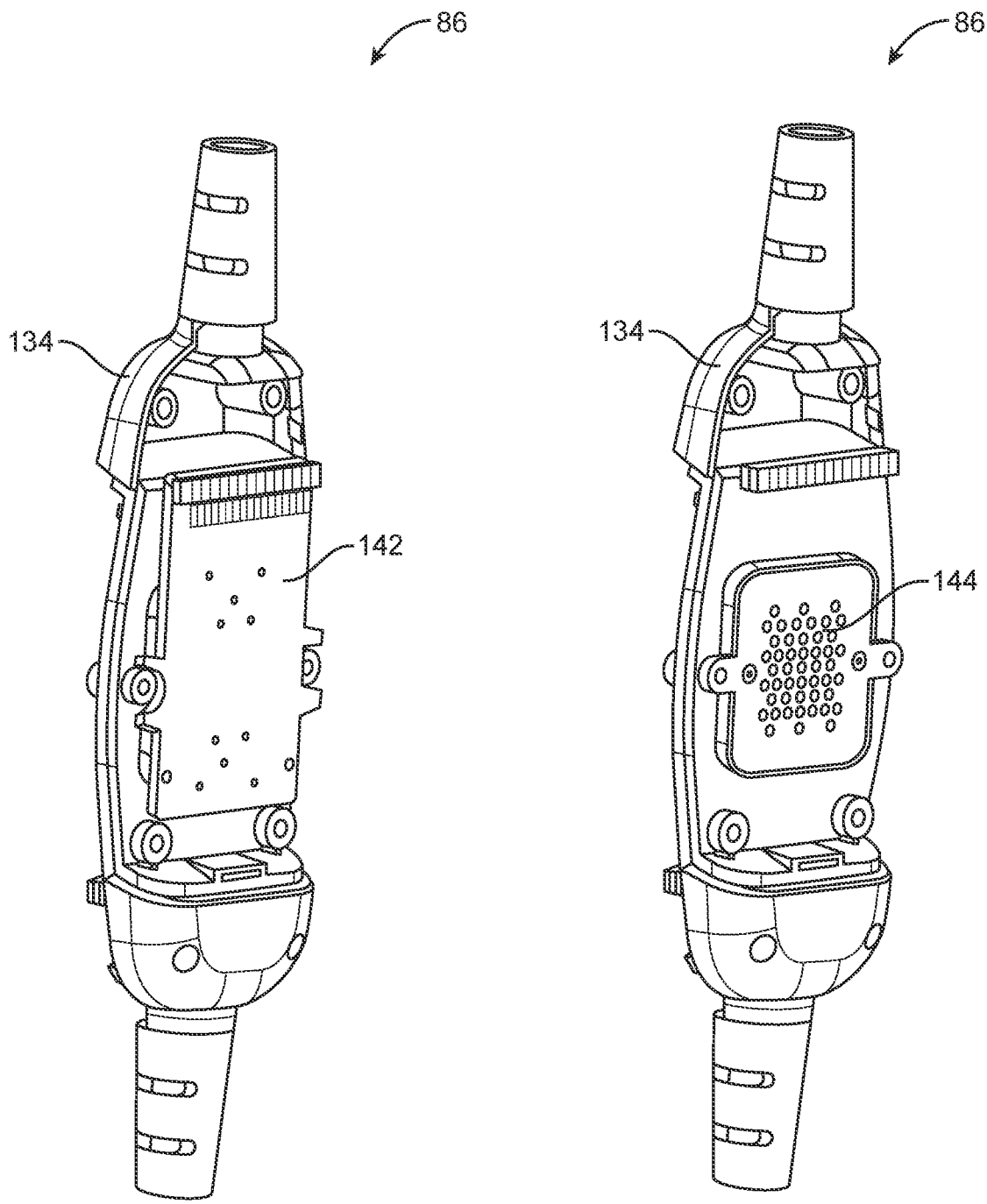

Referring to FIGS. 9A-9F, various aspects of the control and quick release module 86 are depicted. Referring to FIG. 9A, two outer housing 134 components are coupled together using a magnetic coupling configuration which may be enhanced with mechanical latching. Buttons 136 for operation of the associated system may be included. FIG. 9B illustrates a partial cutaway view with the buttons 136 and underlying top printed circuit board 138 shown. Referring to FIG. 9C, with the buttons 136 and underlying top printed circuit board 138 removed, a female contact pin array 140 is visible. Referring to FIG. 9D, with an opposite portion of housing 134 removed, the lower printed circuit board 142 is visible. With the lower printed circuit board 142 removed, as shown in FIG. 9E, a male contact pin array 144 is visible.

Figure 9F:
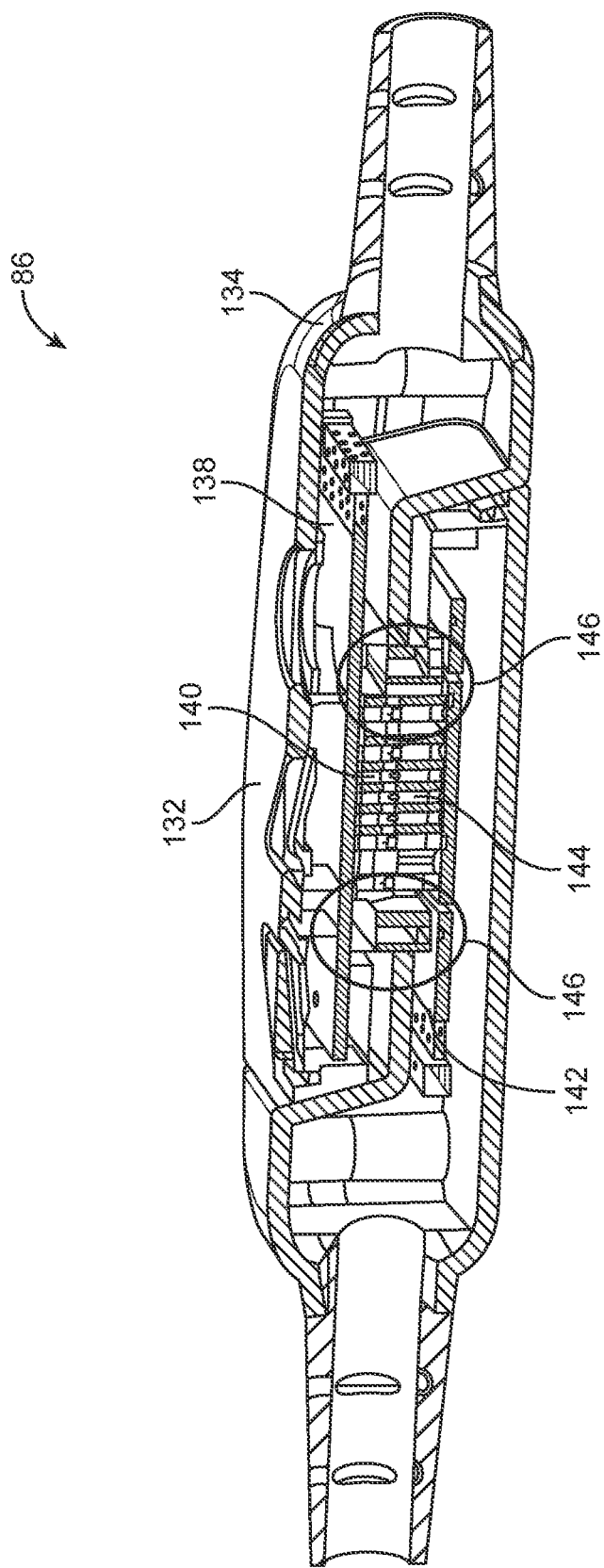

Referring to the cross-sectional view of FIG. 9F, at least one of the male pins or female pins are configured to be spring-loaded such that they may be depressed along each pin's longitudinal axis. In one or more embodiments, the pins may be termed "pogo pins" and may generally comprise a highly conductive material, such as copper or gold. When assembled, the illustrated configuration may mate 46 male pins with female pins, and the entire assembly may be quick-release decoupled in half by manually pulling it apart and overcoming a magnetic interface 146 load which may be developed using north and south magnets oriented around the perimeters of the pin arrays 140, 144.

In one embodiment, an approximate 2 kg load from compressing the 46 pogo pins is countered with a closure maintenance force of about 4 kg. The pins in the arrays 140, 144 may be separated by about 1.3 mm, and the pins may be operatively coupled to conductive lines of various types, such as twisted pairs or other combinations to support USB 3.0, HDMI 2.0, I2S signals, GPIO, and MIPI configurations, and high current analog lines and grounds configured for up to about 4 amps/5 volts in one embodiment.

Figure 10:
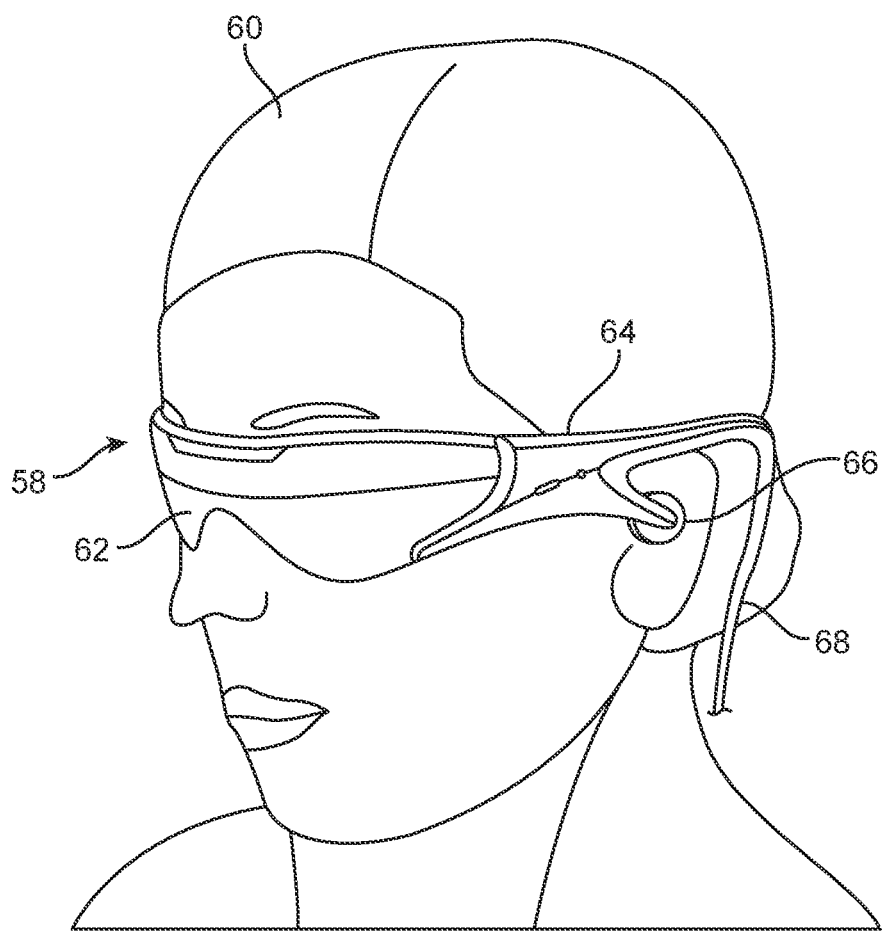
FIG. 10 illustrates one simplified embodiment of the AR device.

Referring to FIG. 10, it is helpful to have a minimized component/feature set to be able to minimize the weight and bulk of the various components, and to arrive at a relatively slim head mounted component, for example, such as that of head mounted component 58 featured in FIG. 10. Thus various permutations and combinations of the various components shown in FIG. 8 may be utilized.

Figure 11A:
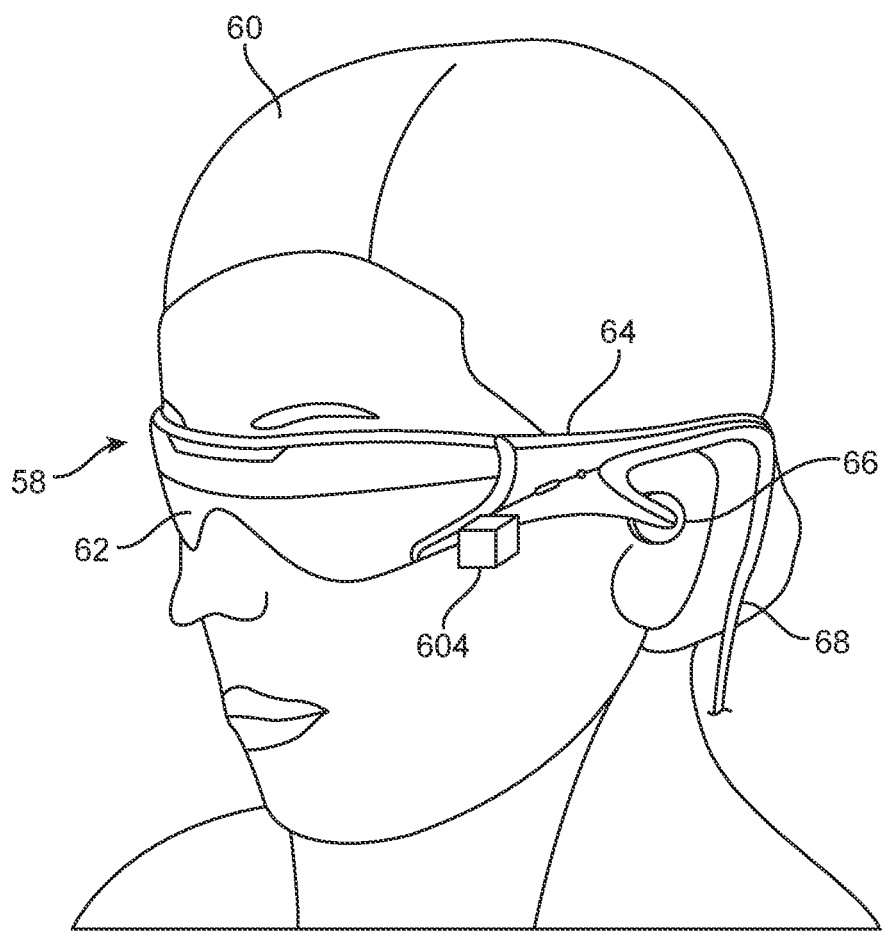
FIGS. 11A and 11B illustrate various embodiments of placement of the electromagnetic sensors on the head-mounted AR system.
Figure 11B:
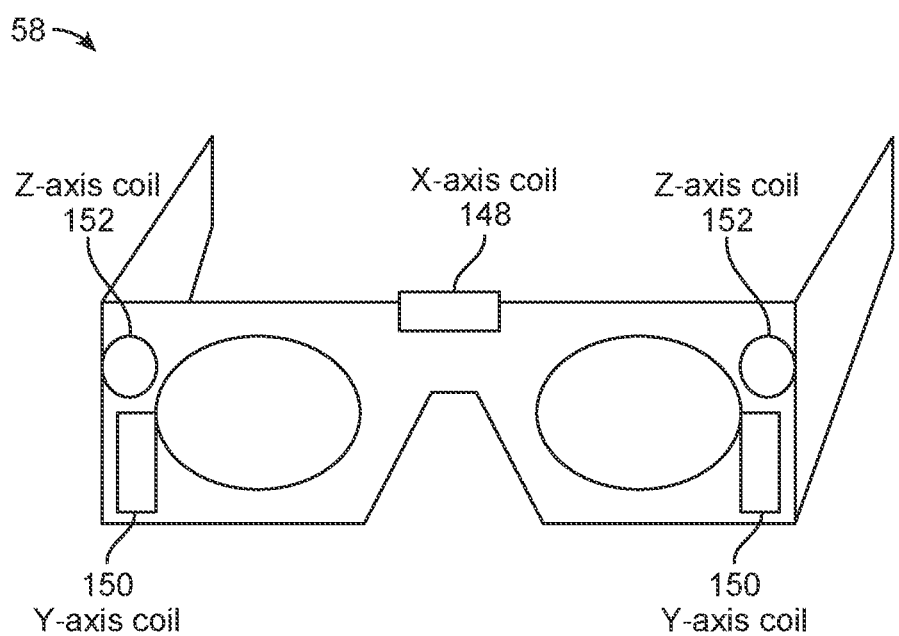

Referring to FIG. 11A, an electromagnetic sensing coil assembly (604, e.g., 3 individual coils coupled to a housing) is shown coupled to a head mounted component 58. Such a configuration adds additional geometry (i.e., a protrusion) to the overall assembly which may not be desirable. Referring to FIG. 11B, rather than housing the coils in a box or single housing as in the configuration of FIG. 11A, the individual coils may be integrated into the various structures of the head mounted component 58, as shown in FIG. 11B. For example, x-axis coil 148 may be placed in one portion of the head mounted component 58 (e.g., the center of the frame). Similarly, the y-axis coil 150 may be placed in another portion of the head mounted component 58 (e.g., either bottom side of the frame). Similarly, the z-axis coil 152 may be placed in yet another portion of the head mounted component 58 (e.g., either top side of the frame).

FIGS. 12A-12E illustrate various configurations for featuring a ferrite core coupled to an electromagnetic sensor to increase field sensitivity. Referring to FIG. 12A, the ferrite core may be a solid cube 1202. Although the solid cube may be most effective in increasing field sensitivity, it may also be the most heavy when compared to the remaining configurations depicted in FIGS. 12B-12E. Referring to FIG. 12B, a plurality of ferrite disks 1204 may be coupled to the electromagnetic sensor. Similarly, referring to FIG. 12C, a solid cube with a one axis air core 1206 may be coupled to the electromagnetic sensor. As shown in FIG. 12C, an open space (i.e., the air core) may be formed in the solid cube along one axis. This may decrease the weight of the cube, while still providing the necessary field sensitivity. In yet another embodiment, referring to FIG. 12D, a solid cube with a three axis air core 1208 may be coupled to the electromagnetic sensor. In this configuration, the solid cube is hollowed out along all three axes, thereby decreasing the weight of the cube considerably. Referring to FIG. 12E, ferrite rods with plastic housing 1210 may also be coupled to the electromagnetic sensor. It should be appreciated that the embodiments of FIGS. 12B-12E are lighter in weight than the solid core configuration of FIG. 12A and may be utilized to save mass, as discussed above.

Figure 13A:
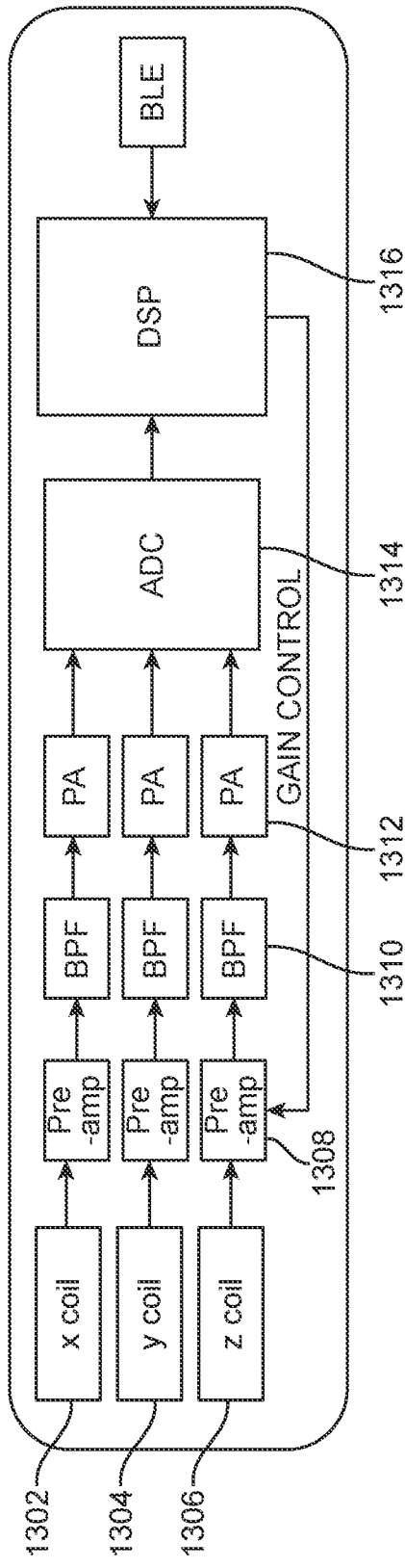
FIG. 13A-13C illustrate various embodiments of circuitry of the electromagnetic sensors.
Figure 13B:
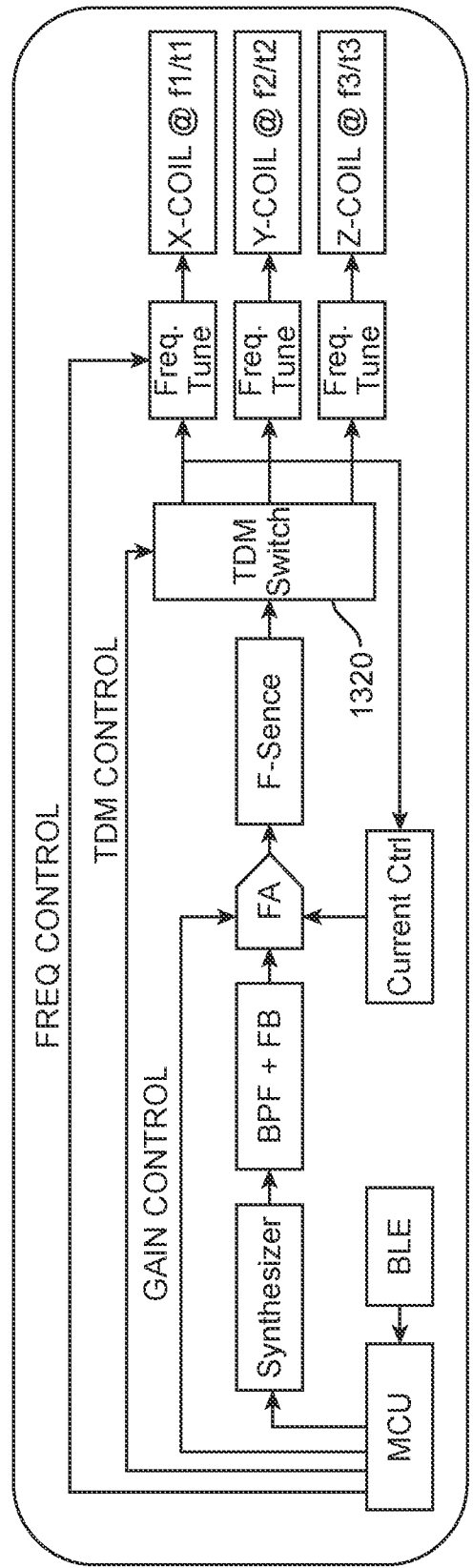
Figure 13C:
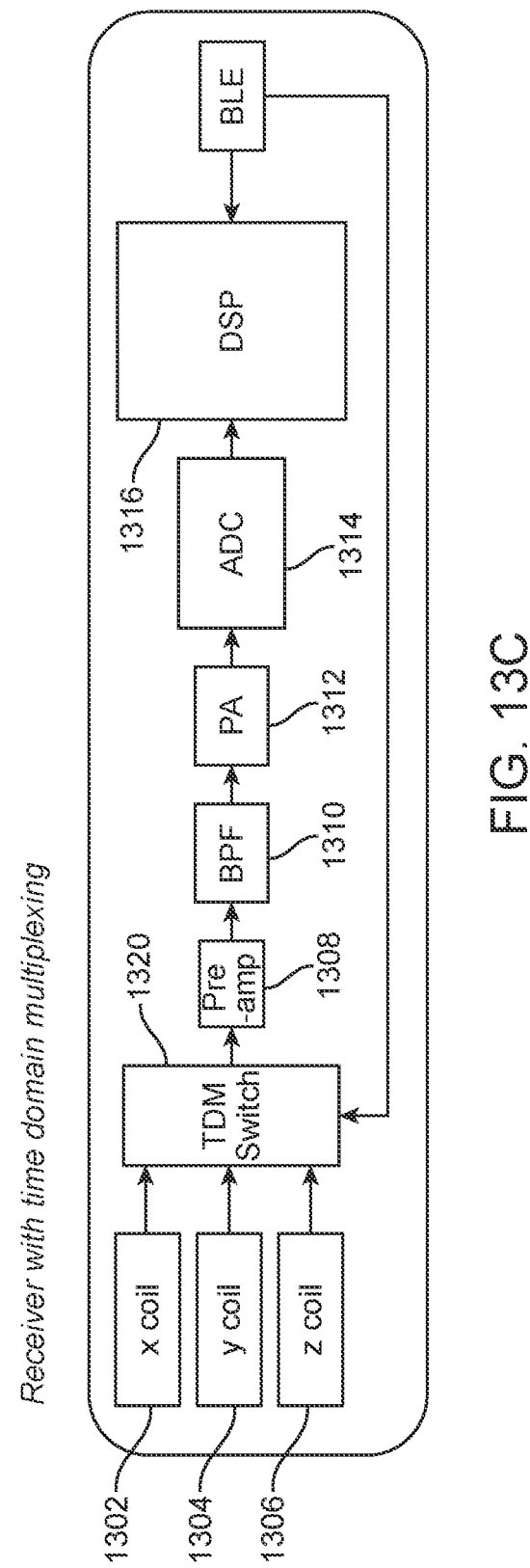

Referring to FIGS. 13A-13C, time division multiplexing ("TDM") may be utilized to save mass as well. For example, referring to FIG. 13A, a conventional local data processing configuration is shown for a 3-coil electromagnetic receiver sensor, wherein analog currents come in from each of the X, Y, and Z coils (1302, 1304 and 1306), go into a separate pre-amplifier 1308, go into a separate band pass filter 1310, a separate pre-amplifier 1312, through an analog-to-digital converter 1314, and ultimately to a digital signal processor 1316.

Referring to the transmitter configuration of FIG. 13B, and the receiver configuration of FIG. 13C, time division multiplexing may be utilized to share hardware, such that each coil sensor chain doesn't require its own amplifiers, etc. This may be achieved through a TDM switch 1320, as shown in FIG. 13B, which facilitates processing of signals to and from multiple transmitters and receivers using the same set of hardware components (amplifiers, etc.). In addition to removing sensor housings, and multiplexing to save on hardware overhead, signal to noise ratios may be increased by having more than one set of electromagnetic sensors, each set being relatively small relative to a single larger coil set. Also, the low-side frequency limits, which generally are needed to have multiple sensing coils in close proximity, may be improved to facilitate bandwidth requirement improvements. It should be noted that there may be a tradeoff with multiplexing, in that multiplexing generally spreads out the reception of radiofrequency signals in time, which results in generally coarser signals. Thus, larger coil diameters may be required for multiplexed systems. For example, where a multiplexed system may require a 9 mm-side dimension cubic coil sensor box, a non-multiplexed system may only require a 7 mm-side dimension cubic coil box for similar performance. Thus, it should be noted that there may be tradeoffs in minimizing geometry and mass.

In another embodiment wherein a particular system component, such as a head mounted component 58 features two or more electromagnetic coil sensor sets, the system may be configured to selectively utilize the sensor and electromagnetic emitter pairing that are closest to each other to optimize the performance of the system.

Figure 14:
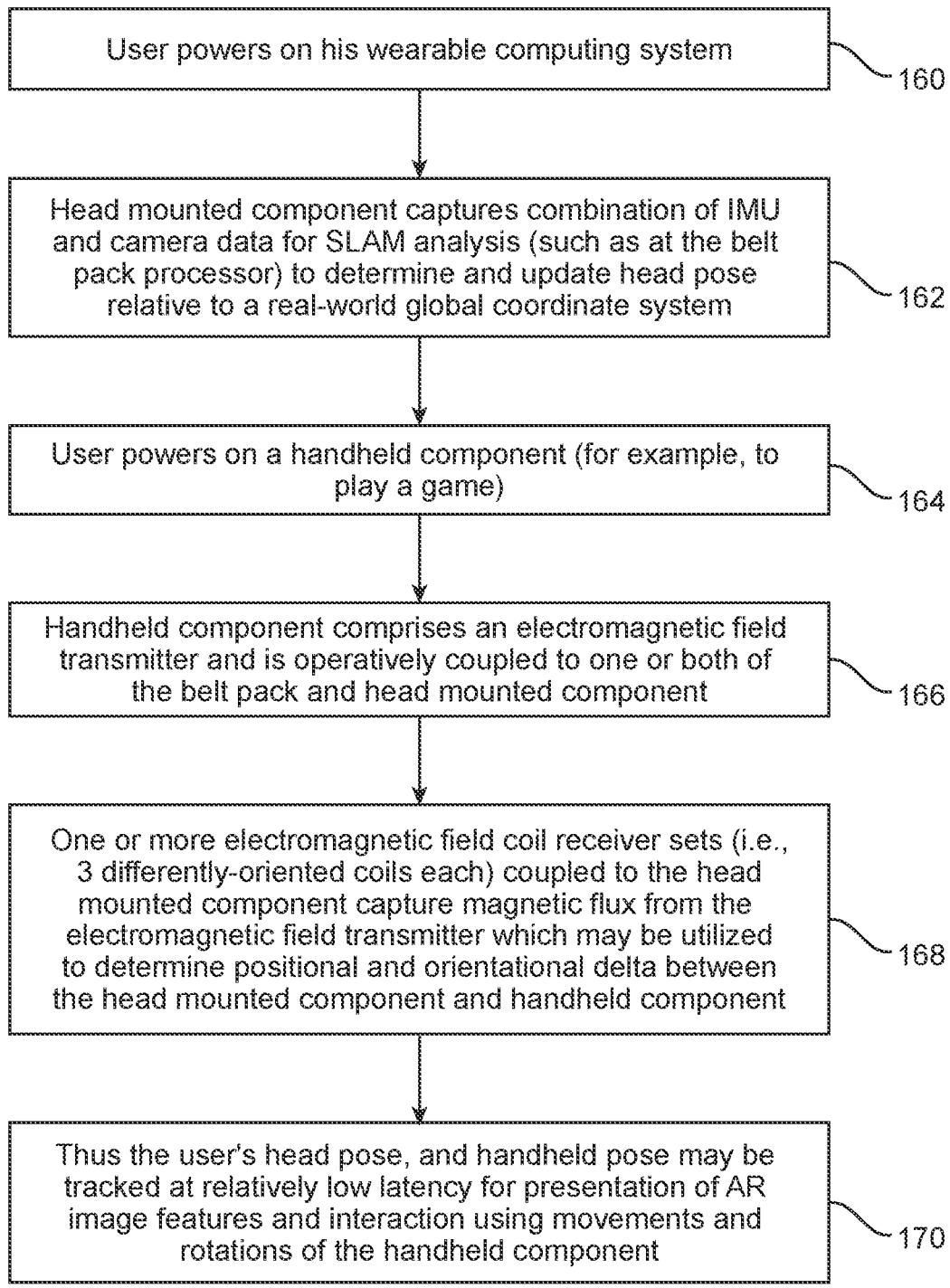
FIG. 14 illustrates an example method of using an electromagnetic tracking system to detect head and hand pose.

Referring to FIG. 14, in one embodiment, after a user powers up his or her wearable computing system 160, a head mounted component assembly may capture a combination of IMU and camera data (the camera data being used, for example, for SLAM analysis, such as at the belt pack processor where there may be more RAW processing horsepower present) to determine and update head pose (i.e., position and orientation) relative to a real world global coordinate system 162. The user may also activate a handheld component to, for example, play an augmented reality game 164, and the handheld component may comprise an electromagnetic transmitter operatively coupled to one or both of the belt pack and head mounted component 166. One or more electromagnetic field coil receiver sets (e.g., a set being 3 differently-oriented individual coils) coupled to the head mounted component may be used to capture magnetic flux from the electromagnetic transmitter. This captured magnetic flux may be utilized to determine positional or orientational difference (or "delta"), between the head mounted component and handheld component 168.

In one or more embodiments, the combination of the head mounted component assisting in determining pose relative to the global coordinate system, and the hand held assisting in determining relative location and orientation of the handheld relative to the head mounted component, allows the system to generally determine where each component is located relative to the global coordinate system, and thus the user's head pose, and handheld pose may be tracked, preferably at relatively low latency, for presentation of augmented reality image features and interaction using movements and rotations of the handheld component 170.

Figure 15:
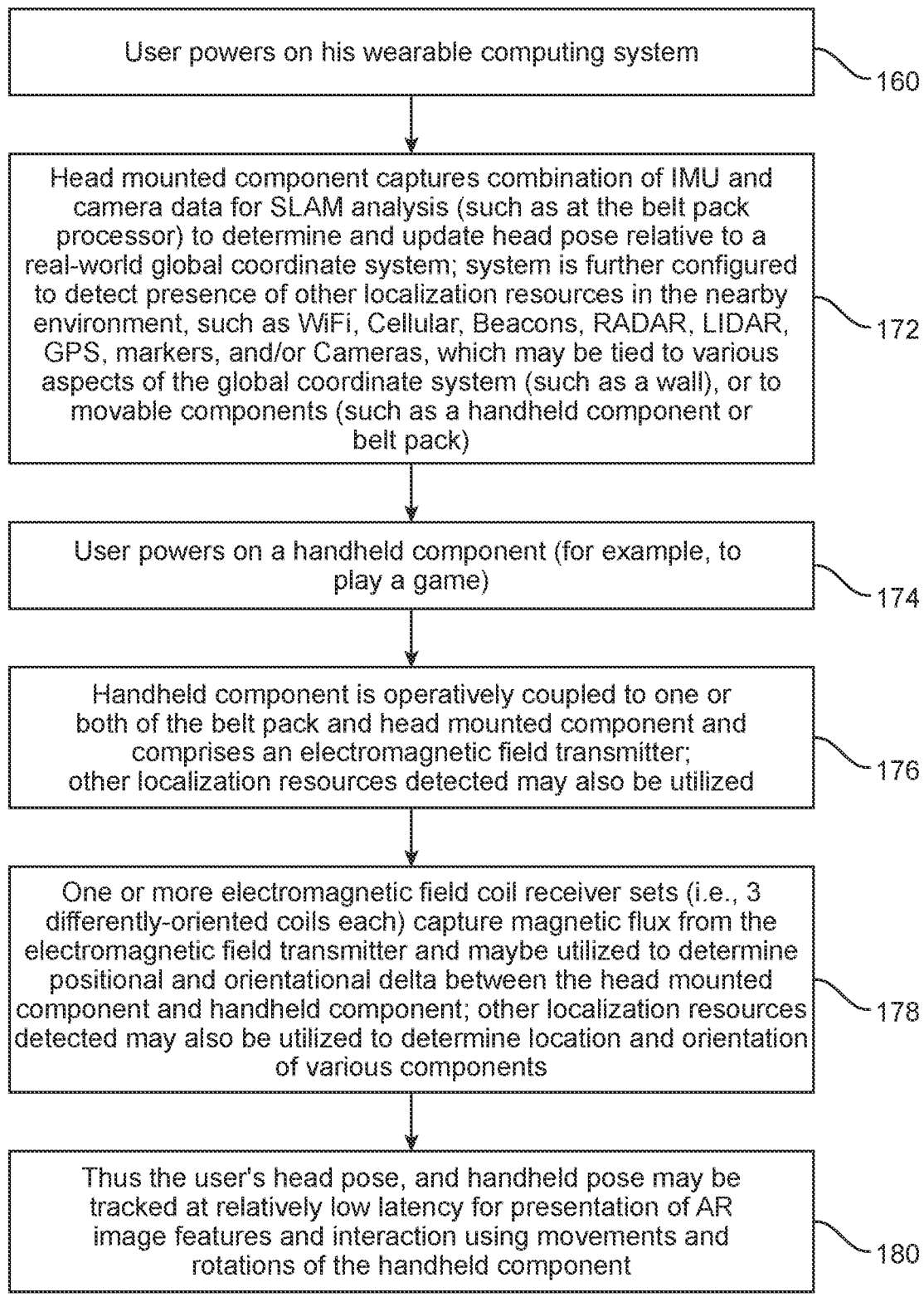
FIG. 15 illustrates another example method of using an electromagnetic tracking system to detect head and hand pose.

Referring to FIG. 15, an embodiment is illustrated that is somewhat similar to that of FIG. 14, with the exception that the system has many more sensing devices and configurations available to assist in determining pose of both the head mounted component 172 and a hand held component 176, 178, such that the user's head pose, and handheld pose may be tracked, preferably at relatively low latency, for presentation of augmented reality image features and interaction using movements and rotations of the handheld component 180.

Specifically, after a user powers up his or her wearable computing system 160, a head mounted component captures a combination of IMU and camera data for SLAM analysis in order to determined and update head pose relative a real-world global coordinate system. The system may be further configured to detect presence of other localization resources in the environment, like Wi-Fi, cellular, beacons, RADAR, LIDAR, GPS, markers, and/or other cameras which may be tied to various aspects of the global coordinate system, or to one or more movable components 172.

The user may also activate a handheld component to, for example, play an augmented reality game 174, and the handheld component may comprise an electromagnetic transmitter operatively coupled to one or both of the belt pack and head mounted component 176. Other localization resources may also be similarly utilized. One or more electromagnetic field coil receiver sets (e.g., a set being 3 differently-oriented individual coils) coupled to the head mounted component may be used to capture magnetic flux from the electromagnetic transmitter. This captured magnetic flux may be utilized to determine positional or orientational difference (or "delta"), between the head mounted component and handheld component 178.

Thus, the user's head pose and the handheld pose may be tracked at relatively low latency for presentation of AR content and/or for interaction with the AR system using movement or rotations of the handheld component 180.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method to display augmented reality, comprising:
   emitting, through an electromagnetic field emitter, a known magnetic field;
   measuring, through an electromagnetic sensor, a parameter related to a magnetic flux at the electromagnetic sensor as a result of the emitted known magnetic field, wherein world coordinates of the electromagnetic sensor are known;
   determining pose information relative to the electromagnetic field emitter based at least in part on the measured parameter related to the magnetic flux at the electromagnetic sensor;
   capturing image data through one or more cameras coupled to a head-mounted component,
   determining head pose information based at least in part on a SLAM analysis utilizing the image data; and
   displaying virtual content on an AR display system to a user based at least in part on both the determined pose information relative to the electromagnetic field emitter and the head pose information;
   wherein the electromagnetic sensor comprises at least three coils to measure magnetic flux in three directions; and
   wherein the at least three coils are integrated into the head-mounted component at different locations of the head-mounted component of the AR display system.

2. The method of claim 1, wherein the electromagnetic field emitter resides in a mobile component of the AR display system.

3. The method of claim 2, wherein the mobile component is a hand-held component.

4. The method of claim 2, wherein the mobile component is a totem.

5. The method of claim 2, wherein the mobile component is a head-mounted component of the AR display system.

6. The method of claim 1, further comprising housing the display system in the head-mounted component, wherein the electromagnetic sensor is operatively coupled to the head-mounted component.

7. The method of claim 1, wherein the world coordinates of the electromagnetic sensor is known based at least in part on SLAM analysis of the image data utilized to determine head pose information.

8. The method of claim 7, wherein the head-mounted component houses the display system.

9. The method of claim 1, wherein the electromagnetic sensors comprise one or more inertial measurement units (IMUs).

10. The method of claim 1, wherein the pose information corresponds to at least a position and orientation of the electromagnetic field emitter relative to the world.

11. The method of claim 1, wherein the pose information is analyzed to determine world coordinates corresponding to the electromagnetic field emitter.

12. The method of claim 1, further comprising detecting an interaction with one or more virtual contents based at least in part on the pose information corresponding to the electromagnetic field emitter.

13. The method of claim 12, further comprising displaying virtual content to the user based at least in part on the detected interaction.

14. The method of claim 1, further comprising decoupling the magnetic field emitted by the electromagnetic field emitter through a control and quick release module.

15. The method of claim 1, further comprising determining the world coordinates of the electromagnetic field emitter through additional localization resources.

16. The method of claim 15, wherein the additional localization resources comprises a GPS receiver.

17. The method of claim 15, wherein the additional localization resources comprises a beacon.

18. The method of claim 1, wherein the electromagnetic sensor comprises a stack of ferrite disks.

19. The method of claim 1, wherein the electromagnetic sensor comprises a plurality of ferrite rods each having a polymer coating.

20. The method of claim 1, wherein the electromagnetic sensor comprises a time division multiplexing switch.

* * * * *